(12) United States Patent
Lim

(10) Patent No.: US 8,228,876 B2
(45) Date of Patent: Jul. 24, 2012

(54) SIGNAL QUALITY DETERMINATION METHODS AND APPARATUS SUITABLE FOR USE IN WLAN-TO-WWAN TRANSITIONING

(75) Inventor: Bing Ying (Miranda) Lim, Nepean (CA)

(73) Assignee: Research In Motion Limited, Waterloo, Ontario (CA)

( * ) Notice: Subject to any disclaimer, the term of this patent is extended or adjusted under 35 U.S.C. 154(b) by 453 days.

(21) Appl. No.: 12/509,002

(22) Filed: Jul. 24, 2009

(65) Prior Publication Data

US 2010/0304738 A1 Dec. 2, 2010

Related U.S. Application Data

(60) Provisional application No. 61/182,409, filed on May 29, 2009.

(30) Foreign Application Priority Data

May 29, 2009 (CA) ..................... 2667820

(51) Int. Cl.
*H04W 4/00* (2009.01)
*H04W 36/00* (2009.01)
(52) U.S. Cl. ......... 370/332; 370/328; 370/331; 455/436
(58) Field of Classification Search .................. 370/328, 370/331, 332; 455/422.1, 436–444
See application file for complete search history.

(56) References Cited

U.S. PATENT DOCUMENTS

| 5,896,570 | A | 4/1999 | Saunders et al. |
| RE37,669 | E | 4/2002 | Kawano |
| 6,381,455 | B1 | 4/2002 | Smolik |
| 7,369,510 | B1 | 5/2008 | Wong et al. |
| 7,400,604 | B2 | 7/2008 | Lee et al. |
| 2004/0039817 | A1 | 2/2004 | Lee et al. |
| 2004/0137905 | A1 | 7/2004 | Jeong et al. |

(Continued)

FOREIGN PATENT DOCUMENTS

EP 1263254 A2 12/2002

(Continued)

OTHER PUBLICATIONS

Khadivi et al., "Dropping Rate Reduction in Hybrid WLAN/Cellular Systems by Mobile Ad Hoc Relaying", Wireless Personal Communications, pp. 515-542, Dec. 2006.

(Continued)

*Primary Examiner* — Ricky Ngo
*Assistant Examiner* — Paul M Masur
(74) *Attorney, Agent, or Firm* — John J. Oskorep, Esq.

(57) ABSTRACT

A mobile terminal performs communication operations for maintaining a voice or data call via a wireless AP of a WLAN. During this time, the mobile terminal identifies a RSSI value and a SNR value of an RF signal of the wireless AP. When the RSSI value is less than a predetermined RSSI value, and the SNR value is less than a predetermined SNR value, the mobile terminal provides an indication to switch the communication operations from the WLAN to a WWAN. However, when the RSSI value is less than the predetermined RSSI value, but the SNR value is greater than the predetermined SNR value, the mobile terminal provides an indication to maintain the communication operations in the WLAN. In a concurrent process, the mobile terminal determines a transmission error value for data packet transmissions based on a count of data packet errors.

20 Claims, 24 Drawing Sheets

U.S. PATENT DOCUMENTS

| | | |
|---|---|---|
| 2004/0142693 A1 | 7/2004 | Feder et al. |
| 2005/0090277 A1 | 4/2005 | Islam et al. |
| 2007/0115899 A1 | 5/2007 | Ovadia et al. |
| 2007/0189259 A1 | 8/2007 | Sollenberger et al. |
| 2008/0076428 A1 | 3/2008 | Jagadeesan et al. |
| 2008/0076430 A1 | 3/2008 | Olson |
| 2008/0102843 A1 | 5/2008 | Todd et al. |
| 2008/0159232 A1 * | 7/2008 | Thalanany et al. ........... 370/332 |
| 2008/0167041 A1 | 7/2008 | Wang et al. |
| 2008/0212542 A1 * | 9/2008 | Kung et al. ................... 370/336 |
| 2008/0280615 A1 * | 11/2008 | Vinayakray-Jani ........... 455/437 |
| 2009/0028112 A1 | 1/2009 | Attar et al. |
| 2009/0141685 A1 | 6/2009 | Berglund |

FOREIGN PATENT DOCUMENTS

| | | |
|---|---|---|
| EP | 1480385 A3 * | 11/2008 |
| KR | 20040079532 A | 9/2004 |
| WO | 0122764 A1 | 3/2001 |
| WO | 03065654 A1 | 8/2003 |
| WO | 2009048817 A2 | 4/2009 |

OTHER PUBLICATIONS

Narisetti, Mary; Thesis entitled "Implementation of Vertical Handoff Algorithm Between IEEE 802.11 WLAN and CDMA Cellular Network," 2006.

Canadian Office Action for CA patent application #2,667,820, Aug. 29, 2011.

Response to Canadian Office Action of Aug. 29, 2011 for Canadian patent application # 2,667,820, Filed May 29, 2009.

* cited by examiner

FIG. 7A

| VERY POOR | POOR | AVERAGE | GOOD |
|---|---|---|---|
| Pvp Drop Thresh (dBm) | PA Drop Thresh (dBm) | AG Drop Thresh (dBm) | |

Dropping Thresholds

| VERY POOR | POOR | AVERAGE | GOOD |
|---|---|---|---|
| Pvp Rise Thresh > Pvp Drop Thresh (dBm) | PA Rise Thresh > PA Drop Thresh (dBm) | AG Rise Thresh > AG Drop Thresh (dBm) | |

Rising Thresholds

| VERY POOR | POOR | AVERAGE | GOOD |
|---|---|---|---|
| Poor If Dropping / Very Poor If Rising | Average If Dropping / Poor If Rising | Good If Dropping / Average If Rising | |

Pvp Drop — Pvp Rise — PA Drop — PA Rise — AG Drop — AG Rise

| VERY POOR | POOR | AVERAGE | GOOD |
|---|---|---|---|
| Poor If Dropping / Very Poor If Rising | Average If Dropping / Poor If Rising | Good If Dropping / Average If Rising | |

-87dBm — -84dBm — -76dBm — -73dBm — -68dBm — -65dBm

708

SIGNAL QUALITY DETERMINATION METHODS AND APPARATUS SUITABLE FOR USE IN WLAN-TO-WWAN TRANSITIONING

CROSS REFERENCE TO RELATED APPLICATIONS

This patent application claims priority to and is a non-provisional patent application of U.S. provisional patent application entitled "Signal Quality Determination Methods And Apparatus Suitable For Use In WLAN-To-WWAN Transitioning" having application No. 61/182,409 and filing date of 29 May 2009, and further claims priority to a Canadian patent application having application number 2,667,820 and filing date of 29 May 2009, each application being hereby incorporated by reference herein.

BACKGROUND

1. Field of the Technology

The present disclosure relates generally to mobile communication devices or terminals which communicate in wireless communication networks, especially mobile terminals which communicate in both wireless local area networks (WLANs) such as IEEE 802.11-based networks, and wireless wide area networks (WWANs) such as cellular telecommunication networks.

2. Description of the Related Art

A mobile communication device or terminal may be designed to operate on two different types of heterogeneous wireless networks, such as a wireless local area network (WLAN) (e.g. IEEE 802.11-based wireless network) and a wireless wide area network (WWAN) (e.g. a cellular telecommunications network). Two different wireless transceiver portions of the mobile terminal are utilized for communications in the WLAN and WWAN.

The mobile terminal may switch communication operations between the WLAN and the WWAN ("vertical handoff") during a voice or data call. The vertical handoff may involve, for example, a handover of a Voice over IP (VoIP) call in the WLAN to a circuit-switched voice call in the WWAN (e.g. GSM network). Acceptable solutions to a "seamless" handover may involve complex processing at several different layers of the Open Systems Interconnect (OSI) model. One particular concern involves the determination of the timing on when to handoff from one technology to another technology, i.e. to predict when the mobile terminal is leaving the coverage of one technology and entering into another. Handing over the call too early results in underutilization of the coverage a network access technology offers, and may undesirably result in "ping-ponging" between two access networks. On the other hand, handing over too late results in call drops and hence a poor user experience. The handover timing is particularly significant for voice calls in a WLAN, as WLAN coverage is short in range and is operating in a frequency band where traffic is highly dynamic and subject to high interference. Algorithms which maintain voice calls in the WLAN when conditions are acceptable would provide a good user experience and would help offload WWAN load by fully utilizing WLAN resources.

Accordingly, what are needed are methods and apparatus to improve mobile terminal transitioning between a WLAN and a WWAN, or other similarly situated wireless networks.

BRIEF DESCRIPTION OF THE DRAWINGS

Embodiments of the present disclosure will now be described, by way of example only, with reference to the attached figures. Same reference numerals are used in different figures to denote similar elements.

FIGS. 7A-7D are illustrative diagrams showing RSSI thresholds which may be utilized in connection with the processing of the RSSI, for use in the RSSI processing module of FIG. 6;

DETAILED DESCRIPTION OF THE EMBODIMENTS

Figure 1:
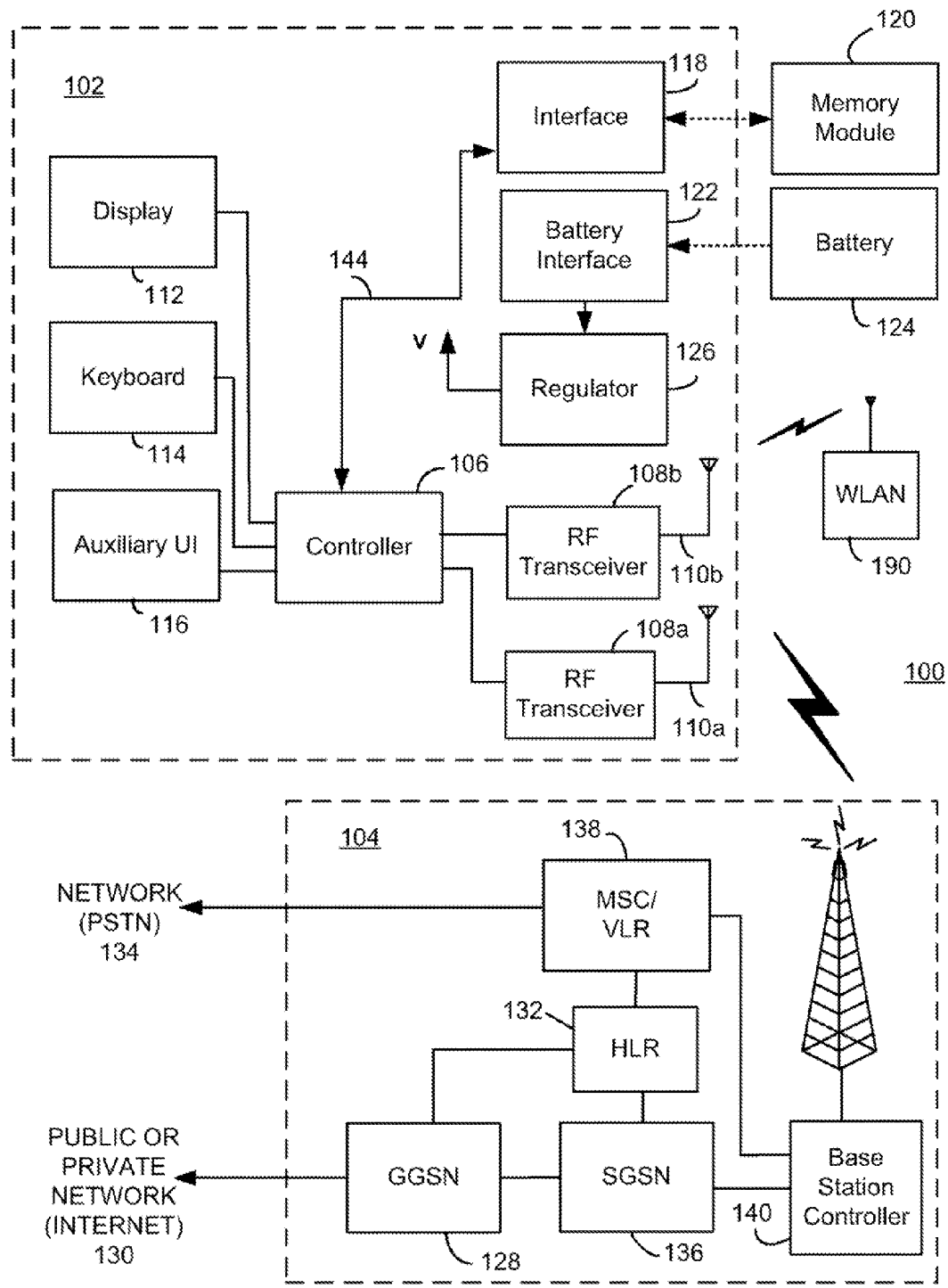
FIG. 1 is a schematic block diagram illustrating the basic components of a mobile terminal operating in a wireless communication system which includes a wireless wide area network (e.g. a cellular telecommunications network) as well as a wireless local area network (WLAN) (e.g. an IEEE 802.11-based network)

As described herein, a mobile communication device or terminal is adapted to operate in a wireless local area network (WLAN) and a wireless wide area network (WWAN). The mobile terminal performs communication operations using its WLAN transceiver portion for maintaining a voice or data call via a wireless access point (AP) of the WLAN. During this time, the mobile terminal is adapted to perform a downlink signal quality determination and an uplink signal quality determination. For the downlink signal quality determination, the mobile terminal identifies a received signal strength indicator (RSSI) value and a signal-to-noise ratio (SNR) value of a radio frequency (RF) signal of the wireless AP. When the RSSI value is less than a predetermined RSSI value, and the SNR value is less than a predetermined SNR value, the mobile terminal provides an indication to switch the communication operations from the WLAN to the WWAN. However, when the RSSI value is less than the predetermined RSSI value, but the SNR value is greater than the predetermined SNR value, the mobile terminal provides an indication to maintain the communication operations in the WLAN using the WLAN transceiver portion. Such technique effectively extends the coverage area of the WLAN for the mobile terminal.

In a concurrent process for the uplink signal quality determination, the mobile terminal determines a transmission error value for data packet transmissions based on a count of data packet errors identified over a predetermined time period. A transmission error percentage value is calculated based on the transmission error value and the total number of attempted data packet transmissions over the predetermined time period. When the transmission error percentage value is greater than a predetermined error percentage value, the mobile terminal provides the indication to switch the communication operations from the WLAN to the WWAN. A data packet error may be identified by identifying a complete failure to transmit the data packet or a reduced data transmission rate for the transmission. An increased count (i.e. >1) or multiplier may be included for each data packet error that is associated with a complete failure or a low data transmission rate, where the increased count or multiplier may vary depending on severity.

In one embodiment, the mobile terminal identifies whether an attempted transmission of a data packet results in a data packet error, whether the data packet error corresponds to a complete failure or a transmission retry, and the data transmission rate of the transmission retry (if the data packet error is indeed associated with a transmission retry). When the mobile terminal identifies the data packet error to correspond to a transmission retry, where the data transmission rate is identified to be greater than a predetermined data transmission rate, the mobile terminal updates the transmission error value by increasing (e.g. incrementing) the transmission error value by a value of n. On the other hand, when the mobile terminal identifies the data packet error to correspond to a transmission retry where the data transmission rate is identified to be less than the predetermined data transmission rate (or a complete failure), the mobile terminal updates the transmission error value by increasing (e.g. incrementing) the transmission error value by a value of m>n. Otherwise, when there is no data packet error, the mobile terminal may refrain from increasing (or incrementing) the transmission error value.

The techniques of the present disclosure may be embodied in a signal processing apparatus for use in a mobile terminal for switching communication operations for a voice or data call from a WLAN to a WWAN. The signal processing apparatus may include an RSSI processing module, a SNR processing module, a range extension module, and a signal quality determination module. The RSSI processing module is adapted to identify an RSSI value of an RF signal of a wireless AP of the WLAN and to provide, at its output, one of a plurality of discrete quality indicators based on the RSSI value. The SNR processing module is adapted to identify a SNR value of the RF signal of the wireless AP and to provide, at its output, one of the plurality of discrete quality indicators based on the SNR value. The range extension module is adapted to provide, at its output, the discrete quality indicator from the RSSI processing module when the RSSI value is greater than a predetermined RSSI value, but provide the discrete quality indicator from the SNR processing module when the RSSI value is less than the predetermined RSSI value. The signal quality determination module is adapted to provide, at its output, an indication to maintain the communication operations in the WLAN when the discrete quality indicator from the range extension module is a first discrete quality indicator, but provide an indication to switch the communication operations from the WLAN to the WWAN when the discrete quality indication from the range extension module is a second discrete quality indicator.

The signal processing apparatus may also include a transmission error processing module. The transmission error processing module is adapted to determine a transmission error value for transmissions from the mobile terminal and to provide, at its output, one of the plurality of discrete quality indicators based on the transmission error value. The signal quality determination module is then further adapted to provide the indication to switch the communication operations from the WLAN to the WWAN when the discrete quality indication from the transmission error processing module is the second discrete quality indicator. The transmission error processing module may be further adapted to determine a transmission error value for transmissions from the mobile terminal based on a count of data packet errors of the transmissions identified over a predetermined time period, and to calculate a transmission error percentage value based on the transmission error value and a total number of attempted data packet transmissions over the predetermined time period. The transmission error processing module may be even further adapted to identify a data packet error by identifying a reduction in a data transmission rate of the transmissions.

As an overview for the present disclosure, a radio layer for WLAN processing in a mobile terminal regularly or periodically produces and submits a signal quality indication to an upper layer. The quality indication may be, for example, (a) GOOD, (b) AVERAGE, (c) POOR, (d) VERY POOR, or (e) NONE. The upper layer has a predetermined quality threshold for which a voice call should be handed over to another radio access technology (e.g. WWAN). If the quality indication is below AVERAGE, for example, the call should be handed over. The signal quality indication may be a general representation of the combined effect of three (3) different WLAN parameters:

(1) RSSI: Received Signal Strength Indicator—an RF parameter used as the principal guiding factor in determining signal quality level; monitored continually or repeatedly on the downlink;

(2) SNR: Signal to Noise Ratio—monitored continually or repeatedly on the downlink; used to extend the WLAN range when RSSI falls to POOR; and (3) Tx Retries: transmission retries—taken into account only when uplink traffic is present; used to detect congested air link in presence of uplink traffic. In one embodiment, this parameter indicates only two quality levels—GOOD or POOR. Whenever Tx Retries indicates the link is POOR, the overall quality indication is POOR regardless of RSSI and SNR.

The RSSI parameter goes through a software alpha filter that provides a smoothed out, averaged RSSI level. The average RSSI level is fed into a PID (Proportional-Integral-Derivative) control loop that outputs parameters indicating the RSSI "trend," taking into account of the immediate change in RSSI, the slope of the RSSI change, and the integral history change of the RSSI over a period of time. The output of the PID loop is fed into a monitoring system that determines whether a quality upgrade or downgrade is required. Once a preliminary signal quality based on RSSI is determined, if the quality drops to POOR because of a poor RSSI level, the SNR is used to determine whether the link is still clean enough (e.g. for the voice call) to maintain the communications in the WLAN. Otherwise, the call may be handed over to the WWAN.

While the SNR and the RSSI provide a good picture of the downlink quality, they are not indicative of the uplink quality, which may include airlink congestion and contention level. Therefore, uplink quality is also assessed and handover decisions may be made based on the same. In one embodiment, the level of contention on the uplink may be derived from the number of transmission retries on the uplink. A transmission retry may be derived from an identified change in transmission rate for the mobile terminal.

The mobile terminal may interface and/or be constructed with a WLAN driver or chipset, where each driver has a rate adaptation algorithm that drops and raises the data transmission rate based on transmission retries and errors. Every data packet transmitted by mobile terminal is normally acknowledged (ACKed) by the wireless AP, and a non-ACKed data packet is automatically retransmitted by a Medium Access Control (MAC) layer at a downgraded transmission rate that is less than the previous transmission rate. Hence, if a data packet is transmitted at a lower rate than requested by the upper layer, it is an indication that a transmission retry has occurred. A retransmission index is assigned to each data packet retry and counts towards a calculation of a percentage of data packets lost over a period of time. If the percentage lost is high, the quality indication is downgraded to POOR as an indication to the upper layer that the airlink is poor (e.g. poor for a voice call).

Although the rate adaptation algorithm of each type of driver may be different from one type to another, the techniques of the present disclosure may be generic to all driver types. To achieve this, the parameters utilized in the technique (e.g. the index values utilized for a given transmission rate or change thereof) may be stored in a programmable memory location in memory of the mobile terminal so as to be tunable or programmable in accordance with the driver type. Thus, the algorithm logic in the mobile terminal (e.g. computer instructions) may remain fixed regardless of (or independent from) the driver type utilized.

Referring now to the drawings, FIG. 1 is a schematic block diagram illustrating the basic components of a mobile communication device or terminal 102 which operates in a wireless communication system 100. As shown in FIG. 1, mobile terminal 102 is adapted to communicate with a wireless communication network 104 which is a wireless wide area network (WWAN), such as a cellular telecommunications network. Also shown, mobile terminal 102 is adapted to communicate with a wireless local area network (WLAN) 190 such as an IEEE 802.11-based wireless network. For wireless communication with wireless network 104, mobile terminal 102 utilizes radio frequency (RF) transceiver circuitry 108a and an antenna 110a. For wireless communication with WLAN 190, mobile terminal 102 utilizes RF transceiver circuitry 108b for IEEE 802.11-based communications and an antenna 110b. With such configuration, mobile terminal 102 may be referred to as a "dual mode" communication device. Although shown in FIG. 1 as having separate and independent transceiver components, at least some portions or components of these otherwise different transceivers may be shared where possible.

Mobile terminal 102 may include a visual display 112, a keypad 114, and optionally one or more auxiliary user interfaces (UI) 116, each of which is coupled to a controller 106. Controller 106 is also coupled to RF transceiver circuitry 108a and antenna 110a, as well as RF transceiver circuitry 108b and antenna 110b. Typically, controller 106 is embodied as a central processing unit (CPU) which runs operating system software in a memory component. Controller 106 will normally control overall operation of mobile terminal 102, whereas signal-processing operations associated with communication functions are typically executed by the RF transceiver circuitry. Controller 106 interfaces with device display 112 to display received information, stored information, user inputs, and the like. Keypad 114, which may be a telephone type keypad or full alphanumeric keypad (e.g. a QWERTY keypad), is normally provided for entering data for storage in mobile terminal 102, information for transmission to network 104, a telephone number to place a telephone call, commands to be executed on mobile terminal 102, and possibly other or different user inputs.

Mobile terminal 102 also includes a battery interface 122 for receiving one or more rechargeable batteries 124. Battery 124 provides electrical power to electrical circuitry in mobile terminal 102, and battery interface 122 provides for a mechanical and electrical connection for battery 124. This provides wireless operation and portability of mobile terminal 102. Battery interface 122 is coupled to a regulator 126 which regulates power to mobile terminal 102.

Mobile terminal 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile terminal 102 may be a multiple-module unit comprising a plurality of separate components, including but in no way limited to a computer or other device connected to a wireless modem. In particular, for example, in the mobile terminal block diagram of FIG. 1, the RF transceiver circuitry and antenna may be implemented as a radio modem unit that may be inserted into a port on a laptop computer. In this case, the laptop computer would include display 112, keypad 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a mobile terminal 102 may have a more particular implementation as described later in relation to mobile station 202 of FIG. 2.

Mobile terminal 102 sends communication signals to and receives communication signals over wireless communications links. For example, mobile terminal 102 may communicate with wireless network 104 via antenna 110a. RF transceiver circuitry 108a performs functions similar to those of a base station controller 140, including for example modulation/demodulation and possibly encoding/decoding and encryption/decryption. It is also contemplated that RF transceiver circuitry 108a may perform certain functions in addition to those performed by base station controller 140.

In the embodiment shown in FIG. 1, wireless network 104 technology is configured in accordance with Global Systems for Mobile communications (GSM) and General Packet Radio Service (GPRS) standards. Such network may further operate in accordance with Enhanced Data rates for GSM Evolution (EDGE) or Enhanced GPRS (EGPRS). Note, however, wireless network 104 may be based on any other suitable network technology, such as a Long-Term Evolution (LTE)-based network, an EVolution-Data Only (EV-DO)-based network, a UMTS-based network, or High Speed Packet Access (HSPA), as examples. It will be apparent to those skilled in art that the RF transceiver circuitry will be adapted to particular wireless network or networks in which mobile terminal 102 is intended to operate.

In the example embodiment of FIG. 1, wireless network 104 includes a base station controller (BSC) 140 with an associated tower station, a Mobile Switching Center (MSC) 138, a Home Location Register (HLR) 132, a Serving GPRS Support Node (SGSN) 136, and a Gateway GPRS Support Node (GGSN) 128. MSC 138 is coupled to BSC 140 and to a landline network, such as a Public Switched Telephone Network (PSTN) 134. SGSN 136 is coupled to BSC 140 and to GGSN 128, which is in turn coupled to a public or private data network 130 (such as the Internet). HLR 132 is coupled to MSC 138, SGSN 136, and GGSN 128. Mobile terminal 102 also operates using a memory module 120, such as a Subscriber Identity Module (SIM) (or e.g. a Universal SIM or U-SIM, or a Removable User Identity Module or R-UIM), which is connected to or inserted in mobile terminal 102 at an interface 118. Controller 106 interacts with memory module 120 through a connection 144 with interface 118.

The tower station coupled to BSC 140 may be a fixed transceiver station, and the tower station and BSC 140 may together be referred to as fixed transceiver equipment. The fixed transceiver equipment provides wireless network coverage for a particular coverage area commonly referred to as a "cell". The transceiver equipment transmits communication signals to and receives communication signals from mobile terminals within its cell via the tower station. The transceiver equipment normally performs such functions as modulation and possibly encoding and/or encryption of signals to be transmitted to the mobile terminal in accordance with particular, usually predetermined, communication protocols and parameters, under control of its controller. The transceiver equipment similarly demodulates and possibly decodes and decrypts, if necessary, any communication signals received from mobile terminal 102 within its cell. Communication protocols and parameters may vary between different networks. For example, one network may employ a different modulation scheme and operate at different frequencies than other networks.

Again, WLAN 190 may be an IEEE 802.11-based wireless network which provides communications for mobile terminal 102 in accordance with IEEE 802.11 standards. Although the present embodiment relates to a WLAN of the IEEE 802.11 type and a WWAN of the cellular network type, any suitable wireless network technologies may be utilized, such as WiMAX technologies (e.g. IEEE 802.16e-based technologies). For example, the WLAN may be an IEEE 802.11-based network and the WWAN may be an IEEE 802.16e-based network. As another example, the WLAN may be an IEEE 802.16e-based network and the WWAN may be the cellular network.

Figure 2:
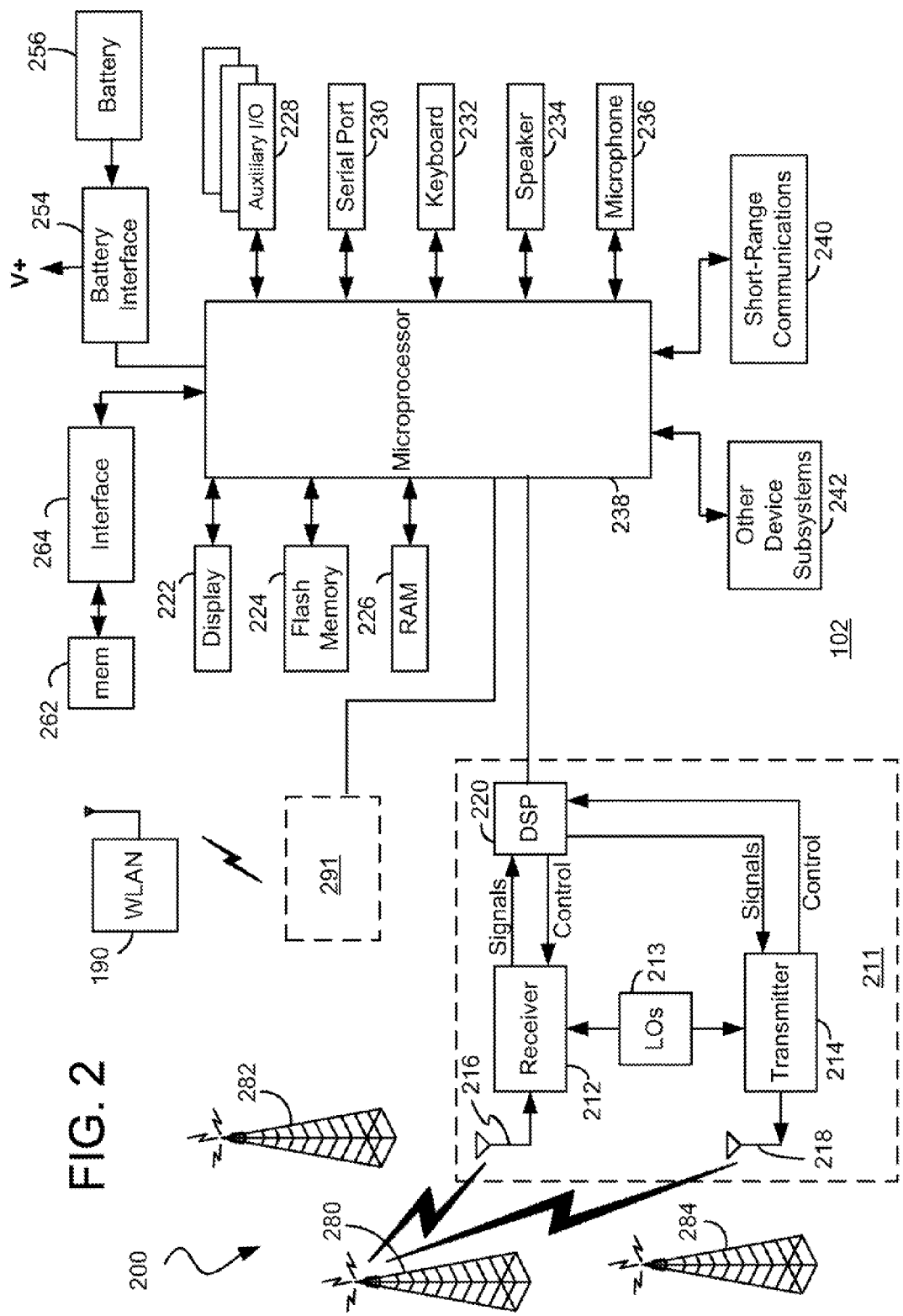
FIG. 2 is a more detailed schematic diagram of the mobile terminal of FIG. 1, namely, a mobile station.

Referring now to FIG. 2, electrical components of one particular type of mobile terminal 102 (e.g. a mobile communication device or mobile station) will be described. Mobile terminal 102 of FIG. 2 is adapted to operate in connection with different communications systems which may be referred to as WLAN and WWAN). Mobile terminal 102 may be a two-way mobile communication device having voice and/or advanced data communication capabilities, which may include the capability to communicate with other computer systems. Depending on the functionality provided by mobile terminal 102, it may be referred to as a data messaging device, a two-way pager, a cellular telephone with data messaging capabilities, a wireless Internet appliance, or a data communication device (with or without telephony capabilities). As mobile terminal 102 is a mobile battery-powered device, it also includes a battery interface 254 for receiving one or more rechargeable batteries 256. Such a battery 256 provides electrical power to most if not all electrical circuitry in mobile terminal 102, and battery interface 254 provides for a mechanical and electrical connection for battery 256. Battery interface 254 is coupled to a regulator (not shown in FIG. 2) that provides a regulated voltage V+ to all of the circuitry.

As described, mobile terminal 102 is adapted to wirelessly communicate with WLANs, such as WLAN 190. In addition, mobile terminal 102 may be adapted to wirelessly communicate with cellular base station transceiver systems 200 of various WWANs, including systems 280, 282, and 284. For communication with cellular networks, mobile terminal 102 utilizes communication subsystem 211. For communication with WLANs, mobile terminal 102 utilizes an additional communication subsystem 291 which may have similar structural components as communication subsystem 211. With such configuration, mobile terminal 102 may be referred to as a "dual mode" mobile station. Although shown in FIG. 2 as having separate and independent subsystems, at least some portions or components of these otherwise different subsystems may be shared where possible.

For communications with the WWAN, communication subsystem 211 includes a receiver 212, a transmitter 214, and associated components, such as one or more (e.g. embedded or internal) antennas 216 and 218, local oscillators (LOs) 213, and a processing module such as a digital signal processor (DSP) 220. Communication subsystem 211 is analogous to RF transceiver circuitry 108a and antenna 110a shown in FIG. 1. As will be apparent to those skilled in field of communications, particular design of communication subsystem 211 depends on the communication network in which mobile terminal 102 is intended to operate.

Network access is associated with a subscriber or user of mobile terminal 102, and therefore mobile terminal 102 requires a memory module 262, such as a Subscriber Identity Module or "SIM" card, a Universal SIM (U-SIM), or a Removable User Identity Module (R-UIM), to be inserted in or connected to an interface 264 of mobile terminal 102 in order to operate in the network. After network procedures have been completed, mobile terminal 102 may send and receive communication signals through the network. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

For communications with WLAN 190, communication subsystem 291 may include modules and processes which operate in accordance with IEEE 802.11 for communications. Communication subsystem 291 may be or include what is referred to as a WLAN driver, with which microprocessor 238 may communicate and control. Communication subsystem 291 may have similar structural components as communication subsystem 211, such as a receiver, a transmitter, and associated components, such as one or more (e.g. embedded or internal) antennas, local oscillators (LOs), and a processing module such as a baseband (BB) and media access control (MAC) processing module. As will be apparent to those skilled in the field of communications, the particular design of communication subsystem 291 depends on the communication network in which mobile terminal 102 is intended to operate. Again, in the present disclosure, communication subsystem 291 (including its associated processor/processing components) are operative in accordance with IEEE 802.11 standards.

Mobile terminal 102 may send and receive communication signals through WLAN 190 after required network procedures have been completed. Signals received by its antenna via the network are input to the receiver, which may perform such common receiver functions as signal amplification, frequency down conversion, filtering, channel selection, and like, including A/D conversion. A/D conversion of a received signal allows more complex communication functions such as demodulation and decoding to be performed in the BB/MAC processing module of communication subsystem 291. In a similar manner, signals to be transmitted are processed, including modulation and encoding, for example, by the BB/MAC processing module: These processed signals are input to the transmitter for D/A conversion, frequency up conversion, filtering, amplification and transmission through the network via the antenna. The BB/MAC processing module not only processes communication signals, but may also provide for receiver and transmitter control. Note that the receiver and transmitter may share one or more antennas through an antenna switch, instead of having two separate dedicated antennas.

Mobile terminal 102 includes a microprocessor 238 that controls overall operation of mobile terminal 102. This control includes the signal processing techniques of the present disclosure, which may also utilize the BB/MAC processing module of communication subsystem 291 and/or DSP 220 if and as needed. Communication functions, including at least data and voice communications, are performed by communication subsystem 211 and subsystem 291 as described above. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. As apparent, some of these subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 may be stored in a persistent store such as flash memory 224, which may alternatively be a read-only memory (ROM) or similar storage element. Those skilled in the art will appreciate that the operating system, specific device applications, or parts thereof, may be temporarily loaded into a volatile store such as RAM 226.

Microprocessor 238, in addition to its operating system functions, enables execution of software applications on mobile terminal 102. A predetermined set of applications that control basic device operations, including at least data and voice communication applications, will normally be installed on mobile terminal 102 during its manufacture. One application that may be loaded onto mobile terminal 102 may be a personal information manager (PIM) application having the ability to organize and manage data items relating to user such as, but not limited to, e-mail, calendar events, voice mails, appointments, and task items. Naturally, one or more memory stores are available on mobile terminal 102 and SIM 256 to facilitate storage of PIM data items and other information.

The PIM application has the ability to send and receive data items via the wireless network. In one embodiment, PIM data items are seamlessly integrated, synchronized, and updated via the wireless network, with the wireless device user's corresponding data items stored and/or associated with a host computer system thereby creating a mirrored host computer on mobile terminal 102 with respect to such items. The host computer system may be, for example, the wireless device user's office computer system. Additional applications may also be loaded onto mobile terminal 102 through network, an auxiliary I/O subsystem 228, serial port 230, short-range communications subsystem 240, or any other suitable subsystem 242, and installed by a user in RAM 226 or a non-volatile store (not shown) for execution by microprocessor 238. Such flexibility in application installation increases the functionality of mobile terminal 102 and may provide enhanced on-device functions, communication-related functions, or both. For example, secure communication applications may enable electronic commerce functions and other such financial transactions to be performed using mobile terminal 102.

In a data communication mode, a received signal such as a text message, an e-mail message, or web page download will be processed by communication subsystem 211 and input to microprocessor 238. Microprocessor 238 may further process the signal for output to display 222 or alternatively to auxiliary I/O device 228. A user of mobile terminal 102 may also compose data items, such as e-mail messages, for example, using keyboard 232 in conjunction with display 222 and possibly auxiliary I/O device 228. Keyboard 232 may be a complete alphanumeric keypad and/or telephone-type keypad. These composed items may be transmitted over a communication network through communication subsystem 211 or 291. For voice communications, the overall operation of mobile terminal 102 is substantially similar, except that the received signals would be output to speaker 234 and signals for transmission would be generated by microphone 236. Alternative voice or audio I/O subsystems, such as a voice message recording subsystem, may also be implemented on mobile terminal 102. Although voice or audio signal output may be accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is an optional component. Serial port 230 enables a user to set preferences through an external device or software application and extends the capabilities of mobile terminal 102 by providing for information or software downloads to mobile terminal 102 other than through a wireless network. The alternate download path may, for example, be used to load an encryption key onto mobile terminal 102 through a direct and thus reliable and trusted connection to thereby provide secure device communication. Short-range communications subsystem 240 of FIG. 2 is an additional optional component that provides for communication between mobile terminal 102 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
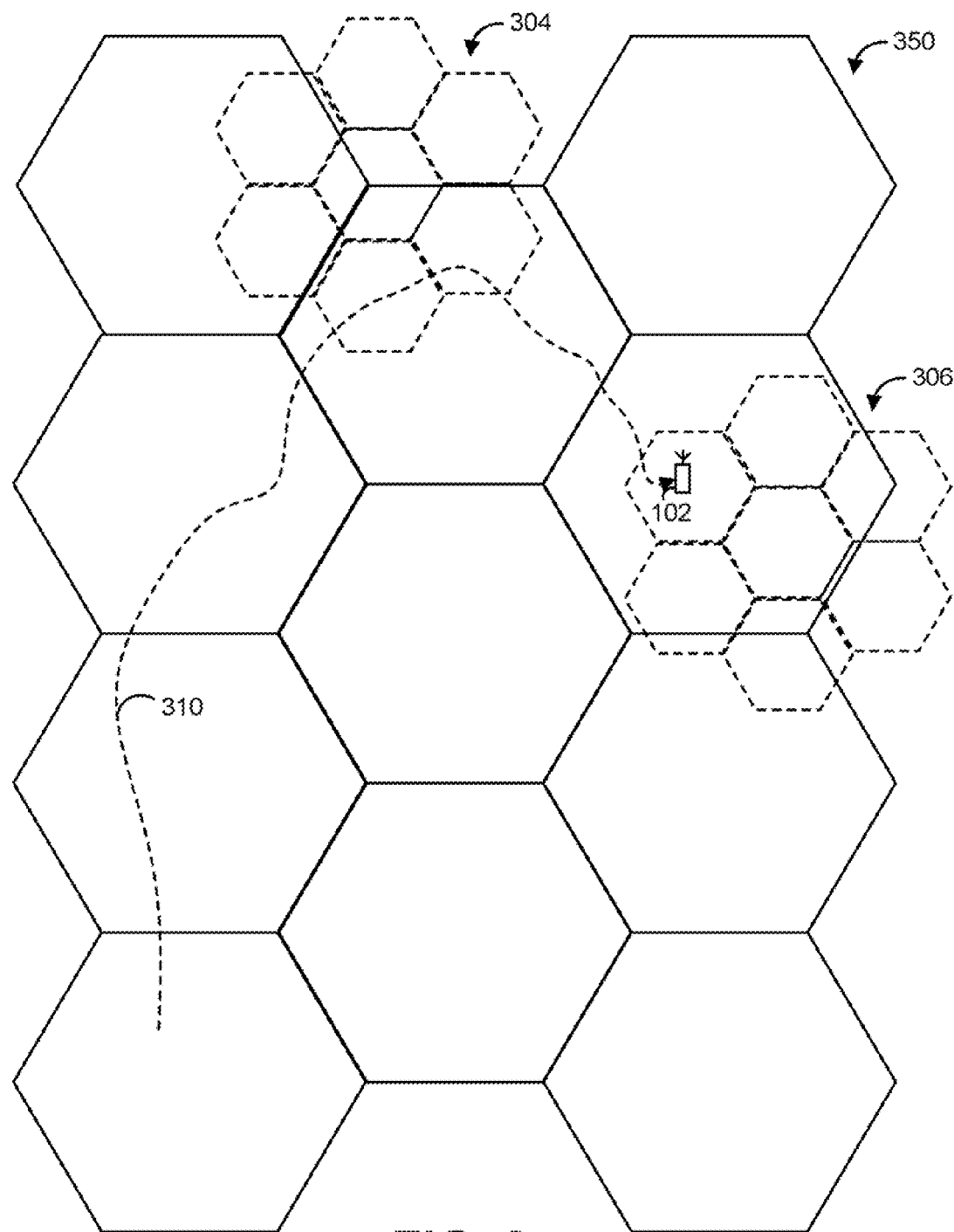
FIG. 3 is a top down view showing a mobile terminal moving in accordance with a travel path through coverage regions of the WWAN and the WLANs.

FIG. 3 is a top down view of a geographic region 300 which shows the mobile terminal 102 of FIG. 1 moving in accordance with a travel path 310 through coverage regions 350 of the WWAN(s) (e.g. GSM/GPRS based network) defined by one or more base stations of the WWAN(s), and coverage regions 304 and 306 of the WLANs (e.g. IEEE 802.11 based network) (defined by one or more wireless APs of the WLAN(s)). As shown, coverage regions 304 and 306 of the WLANs may overlap in whole or in part with coverage regions 350 of the WWANs. As described earlier, mobile terminal 102 has two different RF transceiver portions (e.g. transceiver portions 110a and 110b of FIG. 1) associated with the two different types of networks (WLAN and WWAN) and may have wireless access to only one of the networks (WLAN or WWAN) for services at any given time. The concern of the present disclosure relates to the movement of mobile terminal 102 and providing relatively "seamless" transitions from, for example, coverage region 304 of the WLAN to coverage region 350 of the WWAN while it moves along travel path 310.

Figure 4:
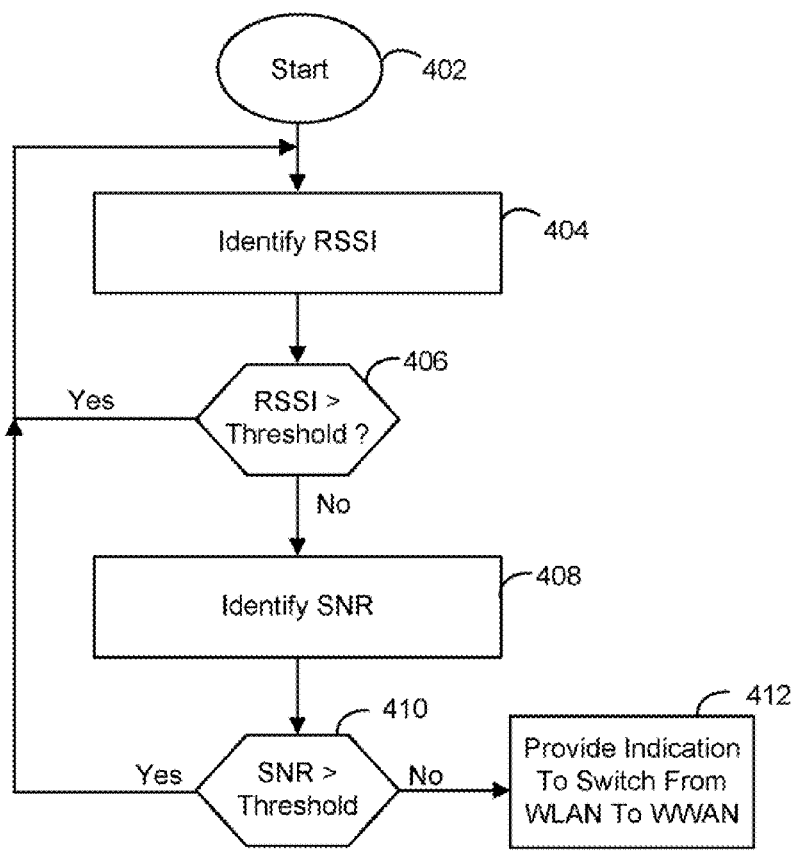
FIGS. 4-5 are flowcharts directed to a method for use in transitioning between a WLAN and WWAN, which may be based on processing of a received signal strength indicator (RSSI) of a radio frequency (RF) signal from a wireless access point (AP) of the WLAN, a signal-to-noise ratio (SNR) of the RF signal, and a transmission error of transmissions from the mobile terminal to the wireless AP.
Figure 5:
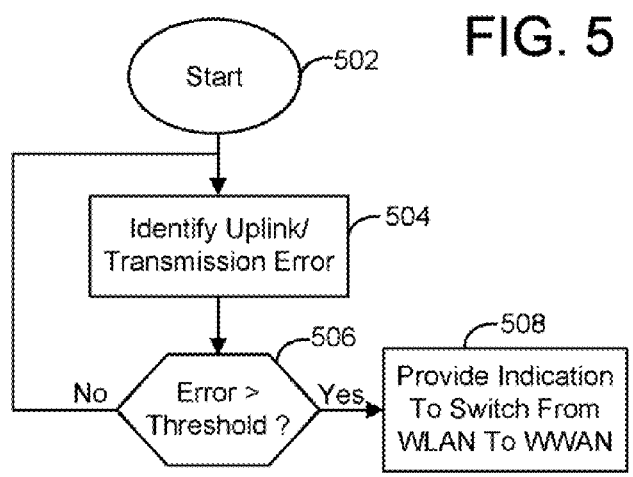

Overview Of Signal Quality Determination And Transitioning Events. As described earlier, what are needed are methods and apparatus to improve mobile terminal transitioning between a WLAN and a WWAN, or other similarly situated wireless networks. FIGS. 4-5 are flowcharts directed to the general methodology utilized for transitioning between a WLAN and WWAN. The general methodology may be based on processing of a received signal strength indicator (RSSI) of a radio frequency (RF) signal from a wireless access point (AP) of a WLAN, a signal-to-noise ratio (SNR) of the RF signal, a transmission error of transmissions from the mobile terminal to the wireless AP, or combinations of the above. The steps of the flowchart are taken from the perspective of the mobile terminal having a dual- or multi-mode capability. The steps of the flowchart are performed by one or more controllers or processors of the mobile terminal (e.g. see FIGS. 1 and 2), and may be embodied as a computer program product which includes a computer readable medium and computer instructions stored in the computer readable medium which are executable by the controllers/processors for performing the method.

The mobile terminal is communicating via a wireless AP of a WLAN to receive communication services. The communication services may involve a voice or data call (e.g. VoIP call) established with a third party entity. For maintaining the voice or the data call, the mobile terminal performs communication operations such as those described in relation to the electrical components of the mobile terminal 202 of FIG. 2. The communication services may be provided in or by the WLAN itself, or alternatively based on generic access network or "GAN" technologies (or e.g. Unlicensed Mobile Access or "UMA" technologies) via a core network of a cellular telecommunications network. Beginning at a start block 402 of FIG. 4, the processor of the mobile terminal identifies a current RSSI value of the RF signal from the wireless AP of the WLAN (step 404 of FIG. 4). If the current RSSI value is greater than a predetermined RSSI threshold value (step 406 of FIG. 4), then the processor provides an indication to maintain communications in the WLAN (i.e. not to switch from the WLAN to the WWAN) (step 414 of FIG. 4). Thus, the mobile terminal remains communicating in the WLAN (ignoring any affects associated with the transmission error determination, see e.g. FIG. 5). The processor causes a repeating back at step 404, for continuing to identify subsequent and updated RSSI values.

If, however, the current RSSI value is less than or equal to the predetermined RSSI threshold value at step 406, then the processor identifies a current SNR value of the RF signal (step 408 of FIG. 4). If the current SNR value is greater than a predetermined SNR value (step 410 of FIG. 4), then the processor provides the indication to maintain communications in the WLAN (i.e. not to switch from the WLAN to the WWAN) (step 414 of FIG. 4). Thus, again, the mobile terminal remains communicating in the WLAN (ignoring any affects associated with the transmission error determination, see e.g. FIG. 5). The processor causes a repeating back at step 404, for continuing to identify subsequent and updated RSSI values. If, however, the current SNR value is less than or equal to the predetermined SNR value at step 410, the processor provides an indication to switch from the WLAN to the WWAN (step 412 of FIG. 4). The processor may subsequently cause the communication operations of the mobile terminal to switch from the WLAN to the WWAN using the WWAN transceiver portion of the mobile terminal.

In the flowchart of FIG. 5, a concurrent process is provided for with respect to transmissions from the mobile terminal (i.e. concurrent to the process of FIG. 4). The same scenario as described above in relation to FIG. 4 applies, where the mobile terminal is communicating via the wireless AP of the WLAN to receive communication services, such as services pertaining to the voice call. Beginning at a start block 502 of FIG. 5, the processor identifies any current uplink/transmission error within a current predetermined time period of operation (step 504 of FIG. 5). If the transmission error is greater than a predetermined transmission error threshold value (step 506 of FIG. 5), then the processor provides an indication to switch from the WLAN to the WWAN (step 508 of FIG. 5). The processor may subsequently cause the communication operations of the mobile terminal to switch from the WLAN to the WWAN using the WWAN transceiver portion of the mobile terminal.

If, on the other hand, the transmission error is less than or equal to the predetermined transmission error threshold value at step 506, then the processor causes a repeating back at step 504, for continuing to identify any subsequent and updated uplink/transmission error for the next predetermined time period. Here, the processor may provide the indication to maintain communications in the WLAN (i.e. not to switch from the WLAN to the WWAN), or may just assume the indication that was provided in relation to the technique of FIG. 4. The mobile terminal therefore remains communicating with the wireless AP of the WLAN (ignoring any affects with respect to the RSSI/SNR determination, e.g. FIG. 4).

In a variation on the technique of FIG. 4, instead of providing the indications on whether to maintain or to switch communications, one of a plurality of discrete quality indications is provided as a result of the decisions in step 406 and step 410. For example, the discrete quality indications may be "POOR" and "GOOD" where the indication in step 412 is POOR and the indication in step 414 is GOOD. Similarly, in a variation of the technique of FIG. 5, one of a plurality of discrete quality indications is provided as a result of the decision in step 506, instead of the indications whether to maintain or to switch communications. Again, for example, the discrete quality indications may be "POOR" and "GOOD" where the indication in step 508 is POOR and the other indication (if provided) is GOOD.

In another variation on the technique, the process of FIG. 5 (as detailed herein, especially In connection with FIGS. 22-23) may be utilized by the mobile terminal without use of the process described in relation to FIG. 4. In yet another alternate embodiment, the process of FIG. 4 (as detailed herein, especially in connection with FIGS. 7-21) may be utilized by the mobile terminal without use of the process described in relation to FIG. 5.

Thus, the "combined" signal quality utilized herein may be viewed as a combined representation of three (3) signal parameters, two (2) of which may be monitored constantly on the downlink and one (1) that is taken into account only when uplink traffic is present:

RSSI: used as the principal guiding factor in determining the overall quality indicator SNR: used to extend wireless network range when the quality indicator of the RSSI drops to POOR Tx Retries: used to detect congested air link under presences of uplink traffic. This parameter may only have two (2) quality indicators—GOOD or POOR. Whenever Tx Retries parameter sets the quality indicator for the uplink as POOR, the overall quality indicator is set to POOR regardless of the quality indicators of the RSSI and SNR.

Based on these inputs, an overall quality level or indication may be regularly or periodically determined and reported for determining whether to maintain communication operations in the WLAN or to switch the communication operations from the WLAN to the WWAN.

Figure 6:
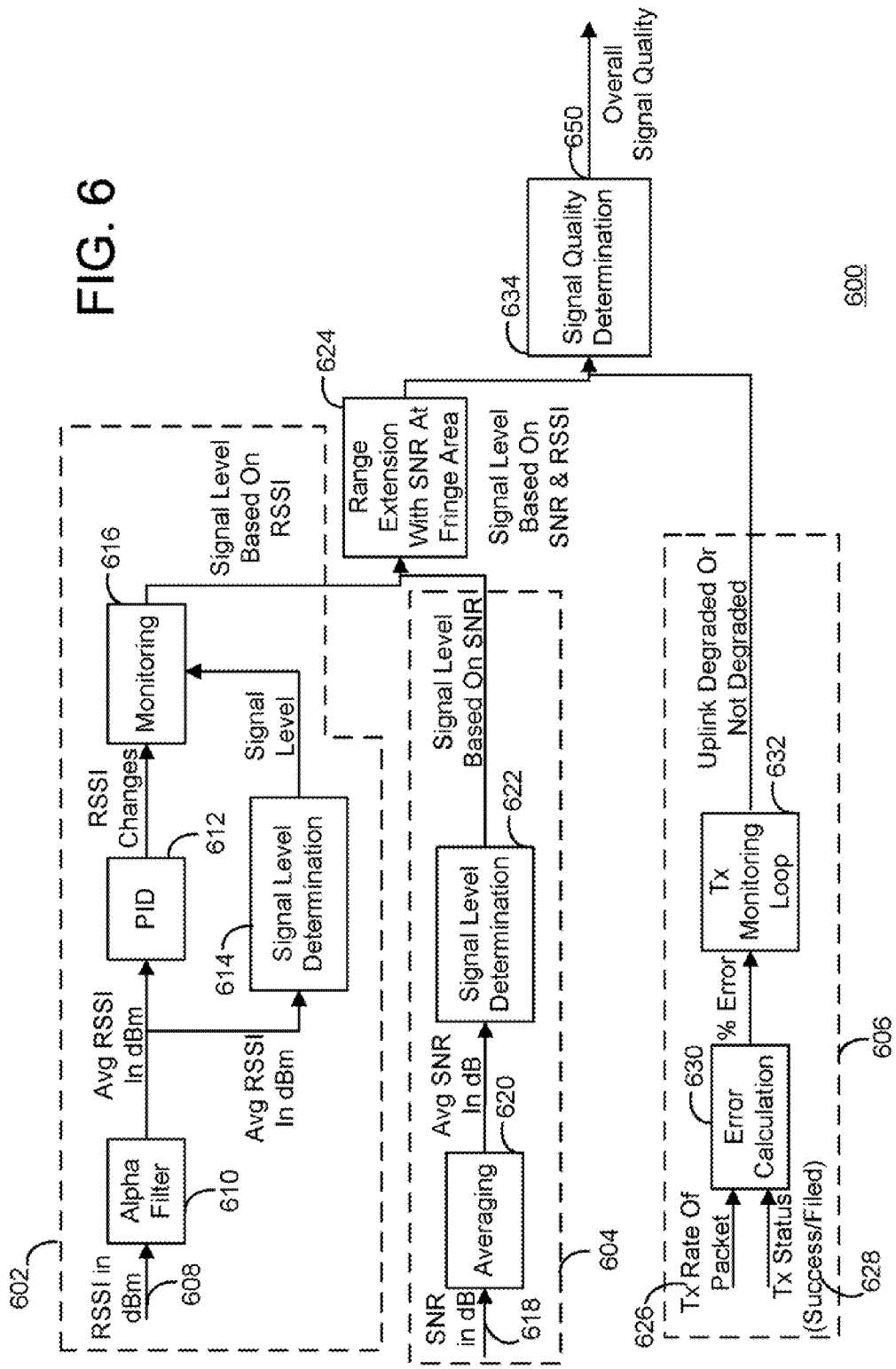
FIG. 6 is a schematic block diagram of relevant processing modules of the mobile terminal for use in connection with the present techniques, which may include a RSSI processing module, a SNR processing module, and a transmission error processing module.
Figure 7E:
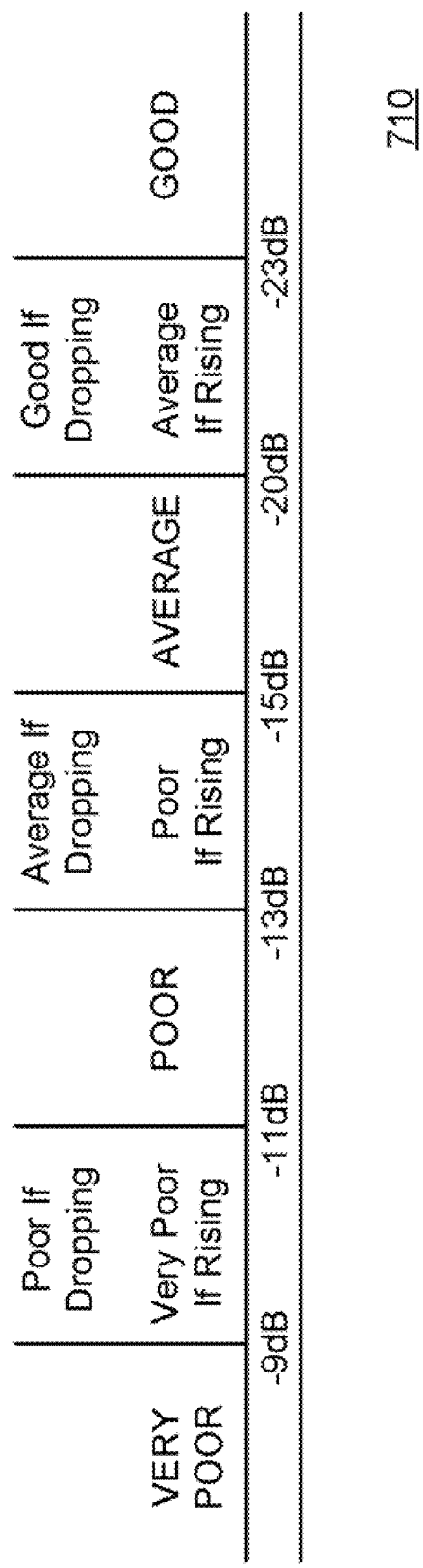
FIG. 7E is an illustrative diagram showing SNR thresholds which may be utilized in connection with the processing of the SNR, for use in the SNR processing module of FIG. 6.

FIG. 6 is a schematic block diagram of a single processing apparatus 600 of the mobile terminal for use in connection with such techniques. In the embodiment shown, signal processing apparatus 600 comprises a plurality of processing modules which include a RSSI processing module 602, a SNR processing module 604, a range extension module 624, a transmission error processing module 606, and a signal quality determination module 634. Depending on the particular embodiment, signal processing apparatus 600 may include fewer or additional processing modules than that shown in FIG. 6.

Note that each module 602, 604, 606, 624, and 634 is adapted to determine and provide a signal quality level at its output which is one of a plurality of discrete quality indicators. In this embodiment, the plurality of discrete quality indicators include: NONE, VERY POOR, POOR, AVERAGE, and GOOD; however, a fewer number or greater number of indicators may be utilized. Thus, outputs from these modules 602, 604, 606, 624 and 634 may be referred to herein as discrete quality indicators or, more generally, as quality indicators or levels.

Note that the processor of the mobile terminal may interface with a WLAN driver (see e.g. the discussion in relation to FIG. 2). The driver provides a mechanism to retrieve RSSI values 608, a mechanism to retrieve SNR values 618, and a mechanism to retrieve information regarding transmission information 626, 628. The RSSI 608 retrieved from the driver (e.g. in dBm) may be a filtered RSSI and not an instantaneous RSSI. Similarly, the SNR 618 retrieved from the driver (e.g. in dB) may be a filtered SNR and not an instantaneous SNR.

The driver may also provide various information on each transmitted data packet which includes (1) transmission status 628, regarding whether or not the transmission was successful (i.e. an ACK from the wireless AP was received for the data packet transmitted); (2) whether a transmission failure was due to driver internal error or over-the-air error (i.e. no ACK received); and (3) the data transmission rate 626 at which a data packet was successfully delivered. The driver has a rate adaptation algorithm that drops and raises the data transmission rate based on transmission retries and errors.

Note further that the signal quality information may be calculated on a periodic basis, e.g. the RSSI and the SNR values are retrieved from the driver periodically. In one embodiment, the period is set to three (3) seconds when no call is maintained via the WLAN and one (1) second when an ongoing call is maintained via the WLAN. The reason for the frequent report period during the call is to allow for a faster response for deciding whether to handoff calls to another radio access technology.

As shown, RSSI processing module 602 of FIG. 6 may include an alpha filter 610, a Proportional-Integral-Derivative (PID) processing module 612, a signal level determination module 614, and a monitoring module 616. SNR processing module 604 may include an averaging module 620 and a signal level determination module 622. Transmission error processing module 606 may include an error calculation module 630 and a transmission monitoring module 632. Range extension module 624 has one or more inputs coupled to the output of the RSSI processing module 602 (more specifically, to the output of monitoring module 616) and to the output of SNR processing module 604 (more specifically, to the output of signal level determination module 622). Signal quality determination module 634 has one or more inputs coupled to the output of the range extension module 624 and to the output of transmission error processing module 606 (more particularly, to the output to the transmission monitoring module 632).

General processing may be provided as follows. The RSSI 608 of the RF signal from the wireless AP is received in RSSI processing module 602. The RSSI 608 is passed through an alpha filter module 610 to smooth out fluctuations, and this result (AvgRSSI) is passed through PID processing module 612. PID processing module 612 produces an output indicating RSSI changes, which is utilized by monitoring module 616 to follow the RSSI trend. Based on the RSSI trend and signal level determination module 614, monitoring module 616 provides one of a plurality of quality indicators based on the RSSI as an output.

On the other hand, the SNR 618 of the RF signal is received in SNR processing module 604. The SNR 618 is averaged in averaging module 620, and the output (AvgSNR) is passed to signal level determination module 622. Signal level determination module 622 produces one of the quality indicators at its output based on this averaged SNR. Note that, in one embodiment, the SNR 618 is assessed and considered only when the quality indicator from the RSSI is indicated as POOR.

Range extension module 624 receives, as inputs, the quality indicators from the outputs of both RSSI processing module 602 and SNR processing module 604. Range extension module 624 produces, at its output, a quality indicator which is based on the RSSI or, if the RSSI is within a predetermined range, the SNR. In one embodiment, range extension module 624 operates to set its output to the quality indicator from RSSI processing module 602 when the RSSI is better than POOR, but when the RSSI is POOR or worse, range extension module 624 sets its output to the quality indicator from SNR processing module 604.

Thus, range extension module 624 operates such that sufficient signal level for the SNR inhibits any WLAN-to-WWAN indication/transition which would otherwise occur due solely to a POOR quality indicator for the RSSI; on the other hand, the WLAN-to-WWAN indication/transition will occur when the both quality indicators for the RSSI and the SNR are POOR. Put another way, when the RSSI is less than a predetermined RSSI value, but the SNR is greater than a predetermined SNR value, communication operations may be maintained in the WLAN (ignoring any affects of the uplink quality determination). On the other hand, when the RSSI is less than the predetermined RSSI value, and the SNR is less than the predetermined SNR value, communication operations may be switched from the WLAN to the WWAN. Such technique operates to extend coverage in the WLAN for the mobile terminal.

The uplink quality is also monitored when data packets are being transmitted. Error calculation module 630 operates to calculate the number of retransmission errors based on the transmission status (Tx status) and the data transmission rate (Tx rate). Transmission monitoring module 632 operates to receive the percent error from module 630 to decide whether link should be downgraded or not, which is provided at its output. Processing involves determining whether the uplink is good or bad, based on transmission errors, retries, and data transmission rates.

Signal quality determination module 634 receives, as inputs, the outputs from range extension module 624 and transmission error processing module 606. If the quality indicator for the uplink is set at POOR, the quality indicator based on the combined RSSI and SNR from range extension module 624 is effectively overridden; otherwise, the overall signal quality indication output 650 from signal quality determination module 634 is set to be the quality indicator based on the RSSI and the SNR.

Processing Associated With The RSSI. Retrieved periodically, RSSI is the magnitude of the received RF waveform—a measurement of the energy level of the AP as perceived by the device. In general, the closer the mobile terminal to the wireless AP, the larger the RSSI value. Following the RSSI trend draws a picture of the distance between the mobile terminal and the AP. As such, it is a guiding factor in determining whether quality indicator is upgraded or downgraded.

Nonetheless, since RSSI is purely an energy measurement on a frequency band, it is susceptible to channel interference and could vary greatly even when the mobile terminal is stationary. As observed, the swing on the RSSI (e.g. from second to second) may be as large as +/−10 dB to 15 dB. Such large fluctuation could lead to misinterpretation of the terminal movement. RSSI processing module 602 reduces the RSSI fluctuation problem for yielding a signal quality estimate that roughly follows the RSSI trend: alpha filter module 612 operates to smooth out the RSSI fluctuation; signal level determination module 614 operates with use of predetermined thresholds and hysteresis values to categorize the RSSI range into signal quality levels; PID processing module 612 operates to track the amount of changes on the average RSSI (output of the alpha filter); and monitoring module 616 operates to use the output of PID module 612 to determine the quality indicator.

In particular, alpha filter module 610 takes as input the current observed value of the signal and outputs a weighted average between the current value and the previous calculated average. It has the effect of cutting off fast fluctuations on the input and hence produces a smoother average signal with which to work. The time domain equation is as follows:

$$y[n]=\alpha*y[n-1]+(1-\alpha)*x[n]$$

$$0 \leq \alpha \leq 1$$

where $x[n]$ is the current value, $y[n]$ is the averaged signal and $\alpha$ is the weight factor. Currently, the algorithm has $\alpha \cong 0.6$. Filtering introduces delay in the response, i.e. a change in the input value is reflected in the output value after certain delay. The delay—time constant of the filter—is $Tc=1/(1-\alpha)$. This represents the number of samples it takes for the system to reach around 63% of the change. As a result, the smaller the $\alpha$, the larger the Tc and the slower the system; such affect should be considered when tuning and setting the $\alpha$ parameter.

Signal level determination module 614 of FIG. 6 receives the averaged RSSI as output from alpha filter module 610. The averaged RSSI is categorized into one of the following quality indicators of VERY POOR, POOR, AVERAGE or GOOD based on the RSSI range that it falls into. Three thresholds are put in place; whenever the average RSSI falls below the threshold, the quality indicator is degraded by one level. These thresholds are referred to as the "Dropping Thresholds". Dropping thresholds are illustrated in the diagram 702 shown in FIG. 7A. To prevent the quality indicator from bouncing back and forth between two different levels when the RSSI is varying around a threshold boundary, hysteresis is put in place on the rising front. If the RSSI has dropped below a certain "Dropping Threshold", it will have to pass the "Rising Thresholds" before the quality indicator is allowed to be upgraded by a level. Rising thresholds are illustrated in the diagram 704 shown in FIG. 7B. The diagram 706 in FIG. 7C depicts the quality indicator that is reported based on the RSSI range, and the diagram 708 in FIG. 7D includes an example set of default values that may be set. Note that these values are programmable and changeable for different WLAN drivers without altering the primary processing algorithm(s).

Figure 8:
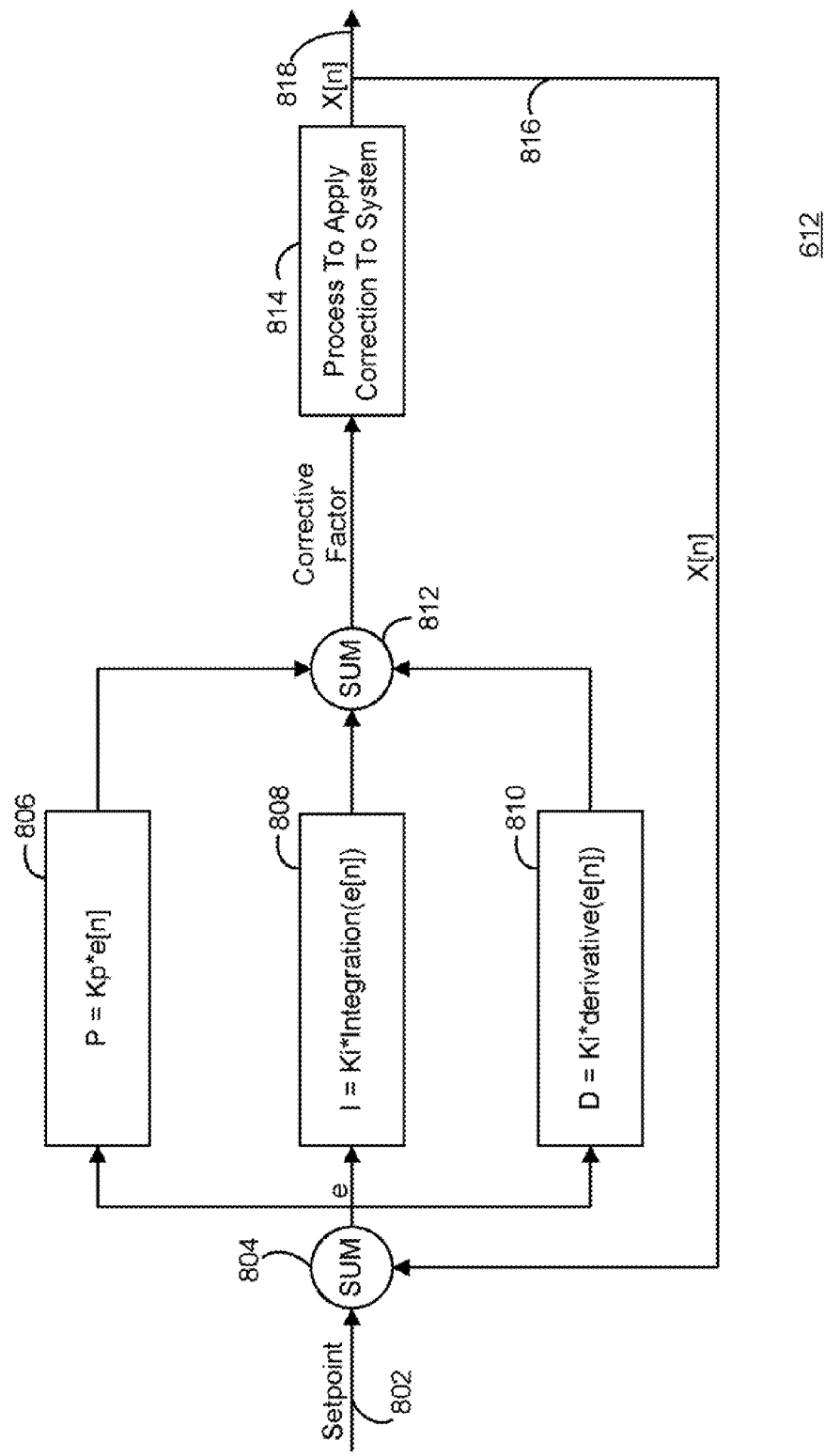
FIG. 8 is a schematic diagram of a Proportional-Integral-Derivative (PID) control loop module which is utilized to process the RSSI in the RSSI processing module of FIG. 6.

FIG. 8 is a schematic diagram of a Proportional-Integral-Derivative (PID) control loop module 612 which is utilized to process the RSSI in RSSI processing module 602 of FIG. 6. PID module 612 is utilized to produce an output 818 which indicates the RSSI "trend" or changes, taking into account the immediate change in RSSI, the slope of the RSSI change, and the integral history change of the RSSI over a period of time. In operation, PID module 612 utilizes a control or feedback algorithm to control system convergence towards a reference point. In particular, it measures an error "e" between a desired setpoint 802 and the current input X[n] 816, and outputs a corrective factor that compensates for the error, thereby forcing PID module 612 to settle at setpoint 802.

PID module 612 calculates the corrective factor based on three (3) parameters: proportional values, integral values, and derivative values. PID module 612 of FIG. 8 includes a first summing module 804 which receives setpoint 802 and the current input X[n] 816, a proportional correction module 806, an integral correction module 808, a derivative correction module 810, a second summing module 812, and a correction application module 814, the modules being coupled as shown in FIG. 8. First summing module 804 sums setpoint 802 with the negative value of the current input X[n], to thereby calculate the error "e". Proportional correction module 806 operates to calculate a correction based on proportional values; it calculates correction based on the current error between setpoint 802 and the current input X[n] 816, i.e. producing an adjustment that reacts to immediate errors. Integral correction module 808 operates to calculate a correction based on integral values; it calculates correction based on the integration (or sum) of recent errors, i.e. producing an adjustment based on the past error records. Derivative correction module 810 operates to calculate a correction based on derivative values; it calculates correction based on the derivative of the error, i.e. producing an adjustment based on the rate of change of the error. Correction application module 814 is utilized to apply the correction factor to the system.

The equations utilized for PID module 612 may be based on the following:

$$CorrectiveFactor[n] = P[n] + I[n] + D[n]$$

$$P[n] = K_p e[n]$$

$$I[n] = K_i \sum_0^n e[n]$$

$$D[n] = K_d \frac{de}{dt} \text{ where}$$

$$0 \le K_p, K_i, K_d \le 1$$

$$e \equiv error = input[n] - input[n-1]$$

where Kp is the proportional gain (the larger the Kp, the more the adjustment for a given error and hence the faster the response; an overly large Kp will however lead to excessive adjustment and oscillation around setpoint);

where Ki is the integral gain (the integral gain works to stabilize at steady state; at steady state where there are slight input fluctuations, the integral term averages out the oscillation and produces a more constant adjustment; at transient state, the integral term becomes larger as error cumulates over time; in general, the larger the Ki, the more stable the system; however, an overly large Ki will lead to adjustment overshot when there is a sudden one-time jump in error since PID module 612 will need time to integrate away the negative effect of the jump); and where Kd is the derivative gain (the derivative gain works with the slope of the error and hence anticipates where the signal is heading; when the error is constant, the derivative term bares no effect on adjustment; larger Kd decreases overshoot but could lead to instability if input fluctuation is frequent and noisy).

Reference is now made back to monitoring module 616 of FIG. 6. While PID module 612 works with a "setpoint" that is fixed, monitoring module 616 works with a "reference level" that gets readjusted from time to time. To illustrate, FIGS. 9-10 are graphs 900 and 1000 which illustrate the cumulative difference corrective factor (CumDiffCorr) versus time for monitoring module 616 of FIG. 6.

Figure 9:
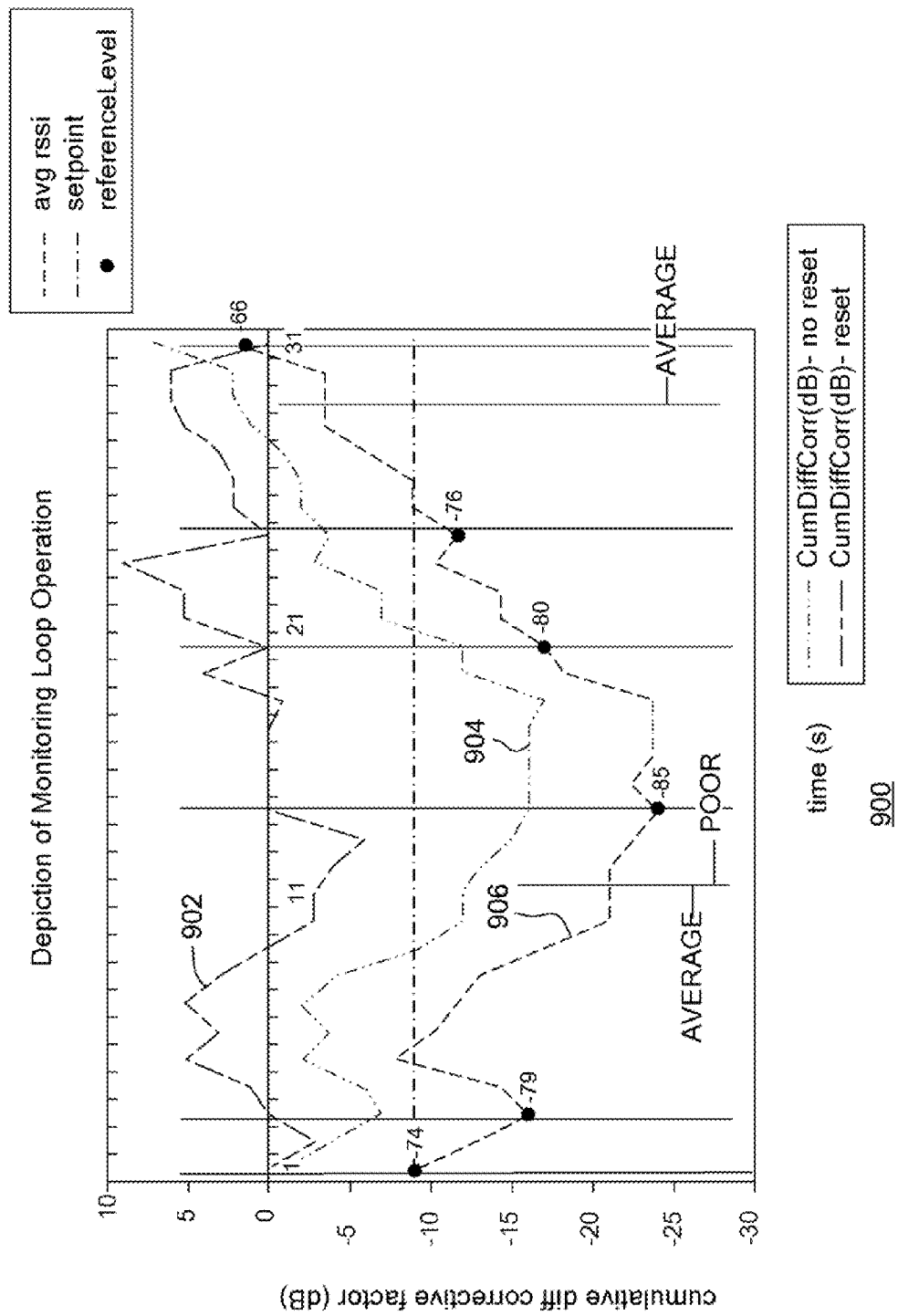
FIGS. 9-10 are graphs which illustrate the cumulative difference corrective factor (CumDiffCorr) versus time for a monitoring module of the RSSI processing module of FIG. 6.
Figure 10:
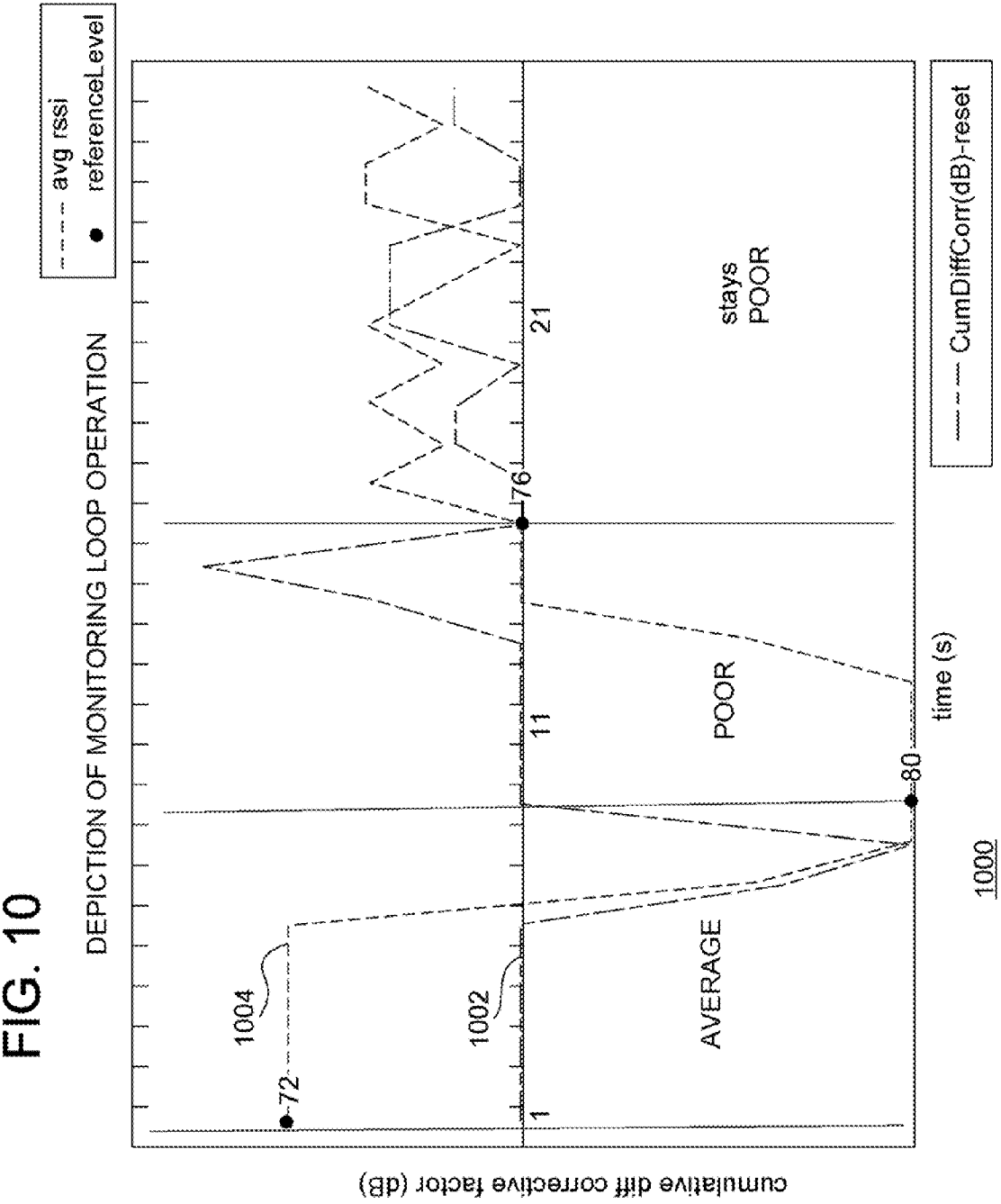

Referring first to graph 900 of FIG. 9, various lines are shown which include a CumDiffCorr "reset" line 902, a CumDiffCorr "no-reset" line 904, and an average RSSI line 906, as well as vertical lines which are reference level lines and a single horizontal line which is the setpoint line or setpoint. The cumulative difference between corrective factors (CumDiffCorr) represents the cumulative changes with respect to a reference RSSI level. For example, line 904 in graph 900 shows the CumDiffCorr values that are not reset since time "0" in graph 900. At time 0, the RSSI level is −74 dBm and the CumDiffCorr is 0 dB; each further point in line 904 thus represents the dB change in RSSI with respect to −74 dBm. Consider now line 902 in graph 900, which shows the CumDiffCorr values that are reset at each vertical line. The first reset occurs when the RSSI is at −79 dBm. Each point in line 902 following this reset represents the cumulative changes with respect to −79 dBm instead of −74 dBm. Further in time, another reset occurs at −85 dBm; the cumDiffCorr now represents a change with respect to −85 dBm. The same logic applies for the rest of graph 900.

The RSSI level that marks the occurrence of a forced CumDiffCorr value reset, which is at the intersection between each line and each vertical line, is referred to as the "reference level" of the monitoring loop. The monitoring module reads and assesses the CumDiffCorr changes around the reference level. If the CumDiffCorr fluctuates within a certain +/− dB range (currently set at +/−3 dB) around the reference level, the monitoring loop is stable and no change in signal quality level is required. If the CumDiffCorr drops below the reference level by a certain dB value (−3 dB), it is an indication that the RSSI trend may be decreasing and a quality indicator readjustment may be required. Finally, if the CumDiffCorr rises above the reference level by a certain dB value (+3 dB), it is then an indication that the RSSI trend may be increasing and a quality indicator readjustment may be required. Each time the monitoring module decides whether to upgrade/downgrade the quality indicator, it resets the CumDiffCorr and restarts monitoring around the new reference level.

Initially, the reference level is set at the RSSI level at association time, which is in this example, −74 dBm. Using the categorization described in relation to FIGS. 7A-7D, 74 dBm is categorized into a signal quality level of AVERAGE, and the monitoring module begins its processing. Just before meeting the first (leftmost) vertical line in the diagram, the monitoring module identifies a dropping trend according to CumDiffCorr; it initiates a checking loop to identify whether the decreases sustain and whether quality needs readjustment. To identify whether the quality indicator needs to be readjusted, it uses the categorization as described in relation to FIGS. 7A-7D against the current average RSSI value. If the current average RSSI categorizes into a level lower than AVERAGE, a downgrade is needed. In this example, downgrade is not required so the quality indicator stays set at AVERAGE. Since a decision to upgrade/downgrade has been made, it resets cumDiffCorr back to 0 at −79 dBm. The monitoring module now operates with a reference level of −79 dBm. At −85 dBm, the cumulative difference has been constantly dropping for a while, the monitoring module goes through the same logic described and determines that a downgrade in the quality indicator is needed. As a result, the quality indicator is dropped to POOR and the cumDiffCorr is reset at −85 dBm.

A quality upgrade may be provided in between and around hysteresis levels. In the previous example, if the monitoring loop is fluctuating within +/−3 dB of the reference level, the quality indicator may not change. This may pose a problem when the average RSSI falls within the hysteresis range provided earlier. Consider the example threshold range provided in FIG. 7D in combination with graph 1000 of FIG. 10, which reveals an average RSSI line 1002 and a CumDiffCorr reset line 1004. The monitoring module first starts with an average RSSI level of −72 dBm which is categorized with the quality indicator of AVERAGE. Subsequently, the RSSI drops to −80 dBm; the monitoring module follows the drop and accordingly downgrades the quality indicator to POOR. Later on, the RSSI increases back to −74 dBm and stays fluctuating around this level. The value of −74 dBm happens to fall in between the hysteresis threshold values of −76 dBm and −73 dBm; because the signal previously dropped below −76 dBm and was downgraded, it has to rise above −73 dBm for the quality indicator to be upgraded again. Thus, if the signal stays fluctuating around −74 dBm, the monitoring module will not upgrade the quality indicator; the cumDiffCorr value will also be small (within +/−3 dB) and hence the quality indicator might not ever be upgraded to AVERAGE. This may result in a misleading characterization that the condition is worse than it actually is. In effect, if the RSSI level stays in between the drop and rise thresholds for a period of time, the quality indicator is upgraded by a single level as the signal has stabilized around a better RSSI range.

An "upgrade check" is embedded within monitoring module 616 to check specifically for situations where the RSSI levels increase from a level that is less than the drop threshold to a level that is greater than the drop threshold, but less than the rise threshold, and remain in that area. Upon a timeout, the monitoring "upgrade check" automatically upgrades the quality indicator by a single level (e.g. POOR to AVERAGE). A similar concept applies if the reference level is set at +/−3 dB around the drop and rise thresholds and the signal is fluctuating slightly around this point. For example, consider that the reference level is at −76 dBm and the signal consistently fluctuates from −78 dBm to −76 dBm. In this scenario, the cumDiffCorr steps may not be large enough to trigger an upgrade or downgrade but since the signal is tends towards one direction, the quality indicator should be upgraded or downgraded accordingly, Extra monitoring logic is embedded at the Monitoring Loop, STABLE state, to guard for these small fluctuation situations.

Retrieved periodically, the RSSI is the magnitude of the received RF waveform, a measurement of the energy level of the wireless AP as perceived by the mobile terminal. In general, the closer the mobile terminal is to the wireless AP, the higher the RSSI. Following the RSSI trend draws picture of the distance between the mobile terminal and the wireless AP. As such, it may be considered as the guiding factor in determining whether the signal quality indication should be upgraded or downgraded. Nonetheless, since the RSSI is purely an energy measurement on a frequency band, it is susceptible to channel interference and may vary greatly even when the mobile terminal is stationary. As observed over field test, the swing on the RSSI from 1 second to another may be quite large (e.g. +/−10 dB to 15 dB in one environment); such large fluctuation could lead to misinterpretation of the mobile terminal movement.

Figure 11:
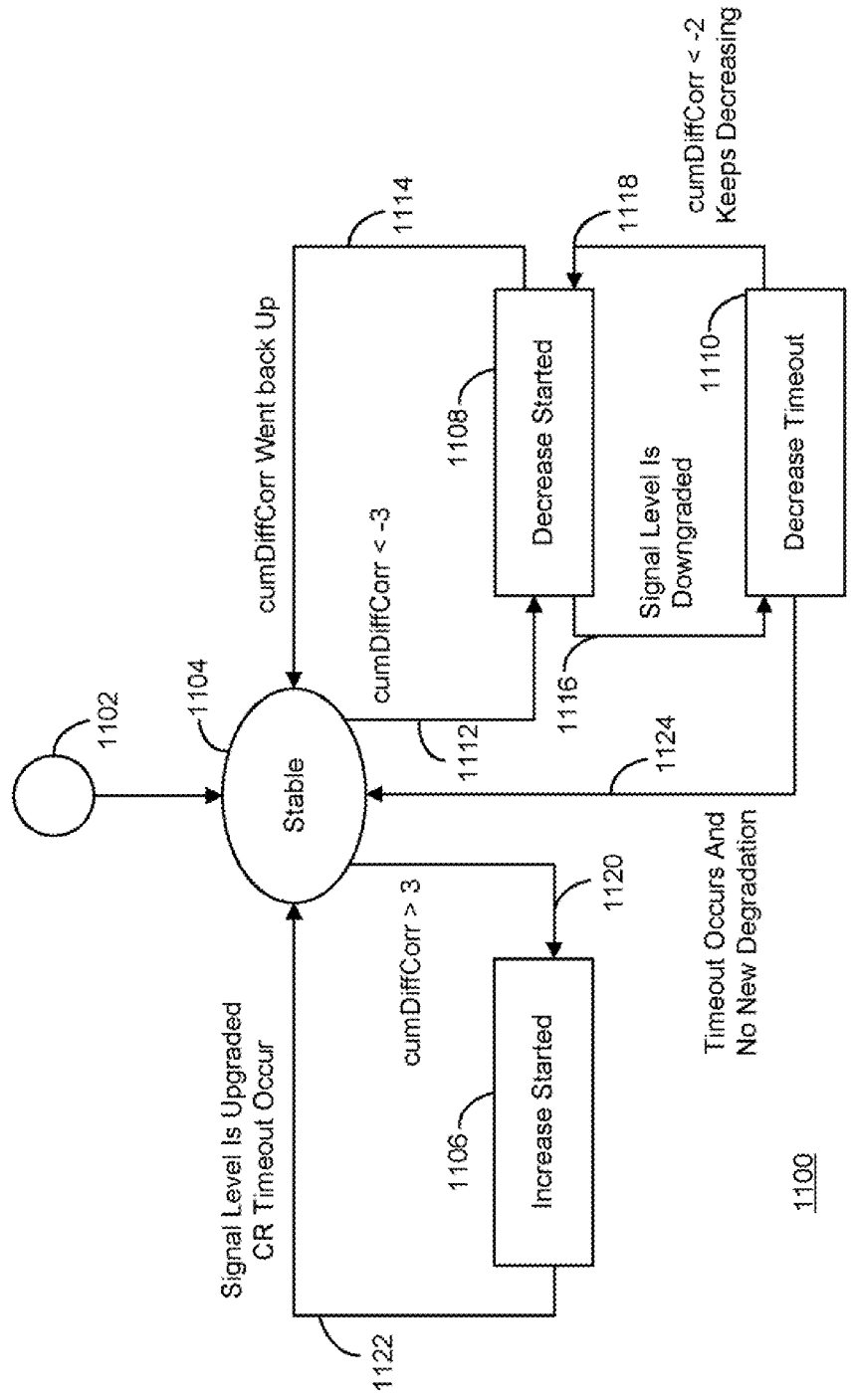
FIG. 11 is a state flow diagram of the RSSI processing module of FIG. 6.

FIG. 11 is a state flow diagram 1100 of the RSSI processing module 602 of FIG. 6. Beginning at a start or initialization state 1102, the module operates in accordance with a STABLE state 1104, an INCREASE STARTED state 1106, a DECREASED STARTED state 1108, and a DECREASE TIMEOUT state 1110. STABLE state 1104 is a state where the RSSI trend is staying around the same level, and no level change is necessary. INCREASE STARTED state 1106 is a state where the RSSI trend appears to be increasing. The RSSI is therefore monitored (more) closely to determine if the RSSI is actually increasing or whether the jump is simply a one-time event. DECREASE STARTED state 1108 is a state where the RSSI trend appears to be decreasing. The RSSI is therefore monitored (more) closely to determine if the RSSI is actually decrease or whether the decrease is simply a one-time event. DECREASE TIMEOUT state 1110 is a state that is entered once the quality indicator is downgraded from DECREASE STARTED state 1108. In this state, the quality indicator cannot be upgraded, so as to reduce the likelihood or prevent the quality indicator from ping-ponging between two different levels.

From start state 1102 of FIG. 11, operation proceeds from STABLE state 1104 which transitions to INCREASE STARTED state 1106 in response to identifying a condition 1122 where the CumDiffCorr value is greater than 3 dB. INCREASE STARTED state 1106 may transition back to STABLE state 1104 in response to identifying a condition 1120 where the quality indicator is upgraded or a timeout occurs. STABLE state 1104 transitions to DECREASE STARTED state 1108 in response to identifying a condition 1112 where the CumDiffCorr value is less than −3 dB. DECREASE STARTED state 1108 may transition back to STABLE state 1104 in response to identifying a condition 1116 where the CumDiffCorr value increases. DECREASE STARTED state 1108 may alternatively transition to DECREASE TIMEOUT state 1110 in response to identifying a condition 116 where the quality indicator is downgraded. DECREASE TIMEOUT state 1110 may transition back to DECREASE STARTED state 1108 in response to identifying a condition 1118 where the CumDiffCorr is less than −2 dB. DECREASE TIMEOUT state 1110 may alternatively transition to STABLE state 1104 in response to identifying a condition 1124 where a timeout occurs and no (new) degradation has been detected.

Figure 12:
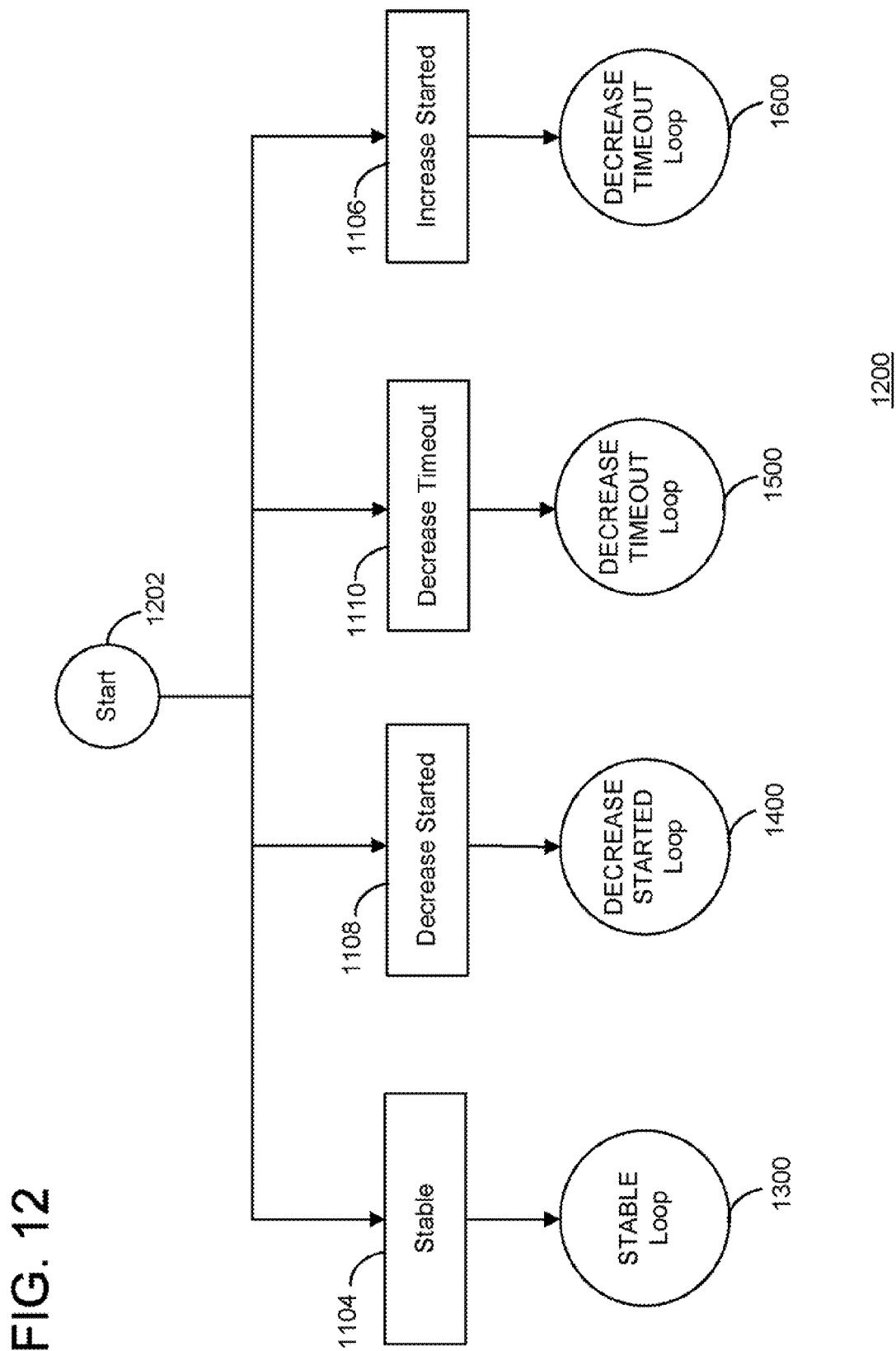
FIG. 12 is a flowchart associated with the state flow diagram of FIG. 11.

FIG. 12 is a flowchart 1200 associated with the state flow diagram 1100 of FIG. 11 pertaining to the RSSI processing module 602 of FIG. 6. Beginning at a start block 1202, the STABLE state 1104 is defined by processes in a STABLE loop 1300 (see the flowchart of FIG. 13), the DECREASE STARTED state 1108 is defined by processes in an DECREASE STARTED loop 1400 (see the flowchart of FIG. 14), the DECREASE TIMEOUT state 1110 is defined by processes in a DECREASE TIMEOUT loop 1500 (see the flowchart of FIG. 15), and the INCREASE STARTED state 1106 is defined by processes in an INCREASED STARTED loop 1600 (see the flowchart of FIG. 16).

Figure 13:
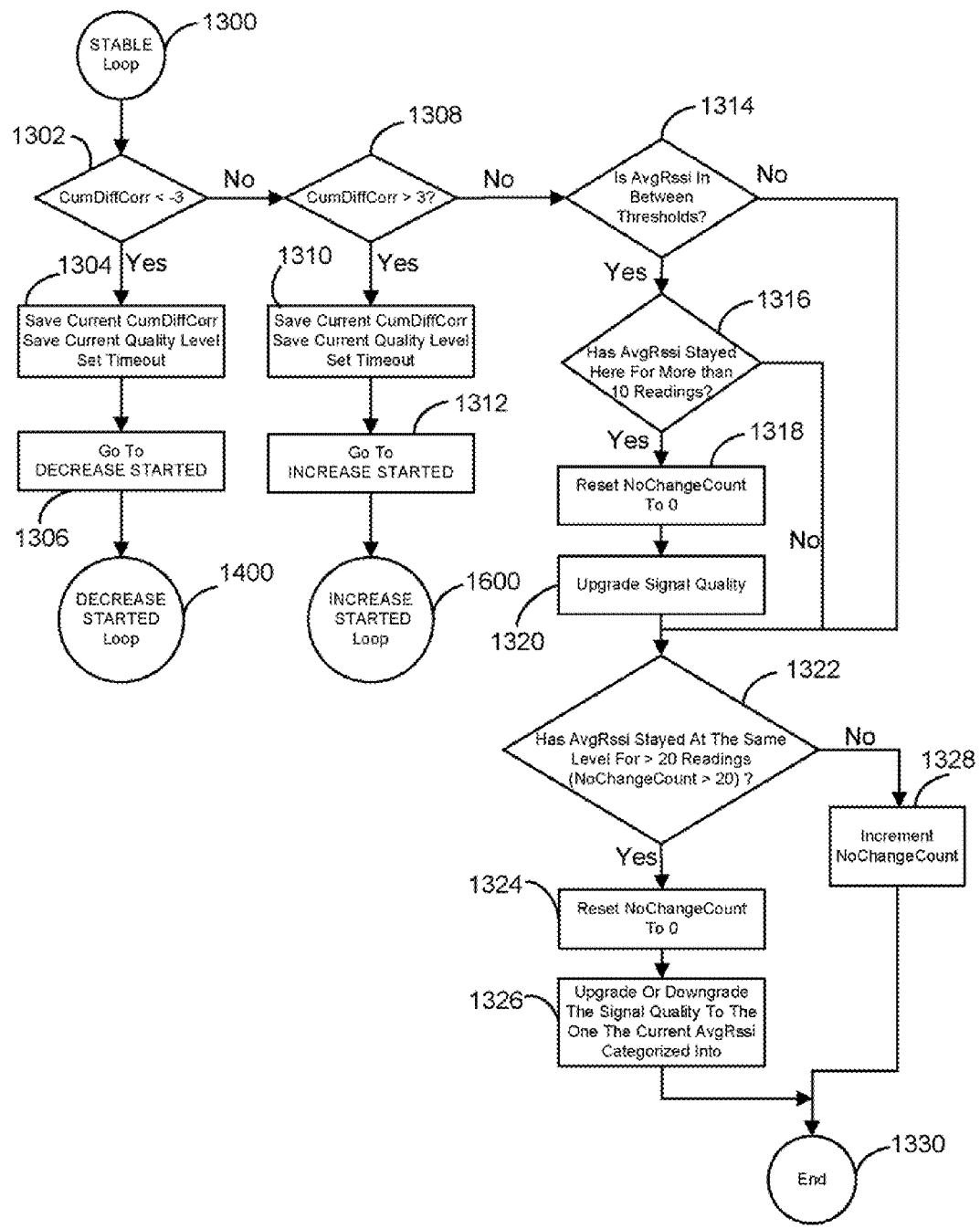
FIG. 13 is a flowchart associated with a STABLE state 1104 of the state flow diagram of FIG. 11.

FIG. 13 is a flowchart associated with a STABLE state 1104 of the state flow diagram 1100 of FIG. 11. Beginning at a start of the STABLE loop 1300, the processor identifies whether the CumDiffCorr is less than −3 dB (step 1302 of FIG. 13). If YES in step 1302, then the processor saves the current CumDiffCorr value, saves the current quality indicator, and sets the timeout timer (step 1304 of FIG. 13). The processor also sets the process to go to DECREASE STARTED (step 1306 of FIG. 13), which is associated with the DECREASE STARTED loop 1400. If NO in step 1302, the processor identifies whether the CumDiffCorr value is greater than 3 dB (step 1308 of FIG. 13). If YES in step 1308, then the processor saves the current CumDiffCorr value, saves the current quality indicator, and sets the timeout timer (step 1310 of FIG. 13). The processor also sets the process to go to INCREASE STARTED (step 1312 of FIG. 13), which is associated with the INCREASE STARTED loop 1600.

If NO in step 1308, then the processor identifies whether the averaged RSSI (AvgRSSI value) has a value that is in between threshold values (step 1314 of FIG. 13). If YES in step 1314, then the processor identifies whether the AvgRSSI value has stayed for more than ten (10) readings (step 1316 of FIG. 13). If YES in step 1316, then the processor resets the NoChangeCount value to zero (0) (step 1318 of FIG. 13). The processor also upgrades the quality indicator (step 1320 of FIG. 13). After step 1320, or if NO in step 1316, the processor identifies whether the AvgRSSI value has stayed at the same level for greater than twenty (20) readings (i.e. NoChangCount>20) (step 1322 of FIG. 13). If YES in step 1322, then the processor resets NoChangeCount to zero (0) (step 1324 of FIG. 13). The processor also upgrades or downgrades the quality indicator to match the quality indicator of the current AvgRSSI (i.e. the one the current AvgRSSI is categorized into) (step 1326 of FIG. 13). If NO in step 1322, then the processor increments the NoChangeCount value (step 1328 of FIG. 13). After step 1326 or 1328, the flowchart ends at an end block 1330.

Figure 14:
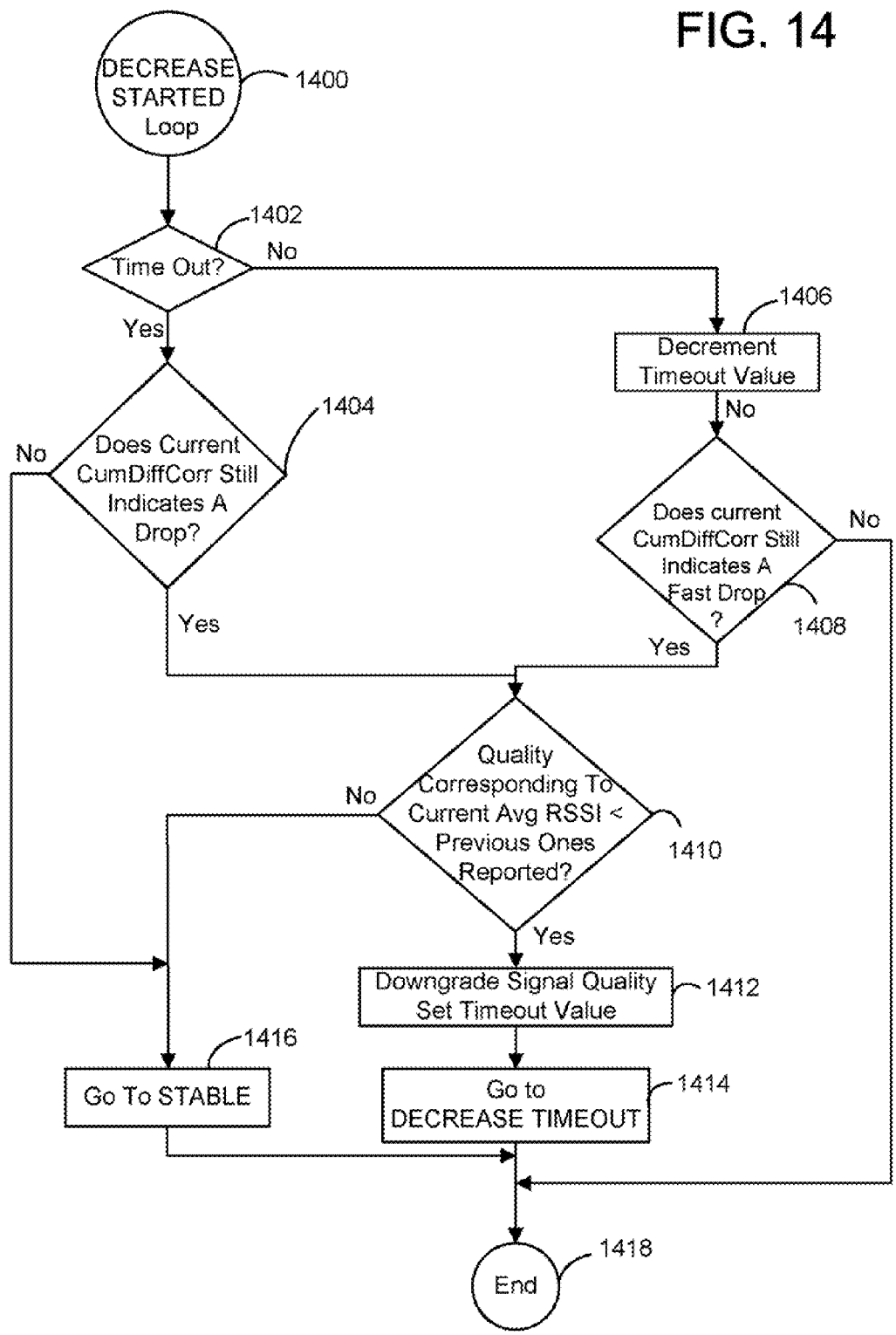
FIG. 14 is a flowchart associated with a DECREASE STARTED state of the state flow diagram of FIG. 11.

FIG. 14 is a flowchart associated with DECREASE STARTED state 1108 of the state flow diagram 1100 of FIG. 11. Beginning at a start of the DECREASE STARTED loop 1400, the processor identifies whether a time out has occurred (step 1402 of FIG. 14). If YES in step 1402, the processor identifies whether the current CumDiffCorr value still indicates a drop (step 1404 of FIG. 14). If NO in step 1404, the processor sets the process to go to STABLE (step 1416 of FIG. 14). If NO in step 1402, then the timeout value is decremented (step 1406 of FIG. 14) and the processor identifies whether the current CumDiffCorr value still indicates a drop (e.g. a relatively fast or quick drop) (step 1408 of FIG. 14). If YES in step 1408, or YES in step 1404, the processor identifies whether the quality corresponding to the current average RSSI is less than one or more previously received RSSI values (step 1410 of FIG. 14). If NO in step 1410, the processor sets the process to go to STABLE (step 1416 of FIG. 14). If YES in step 1410, the processor downgrades the quality indicator and sets the timeout timer (step 1412 of FIG. 14). The processor also sets the process to go to DECREASE TIMEOUT (step 1414 of FIG. 14). After step 1414, or after step 1416, or if NO in step 1408, the flowchart ends at an end block 1418.

Figure 15:
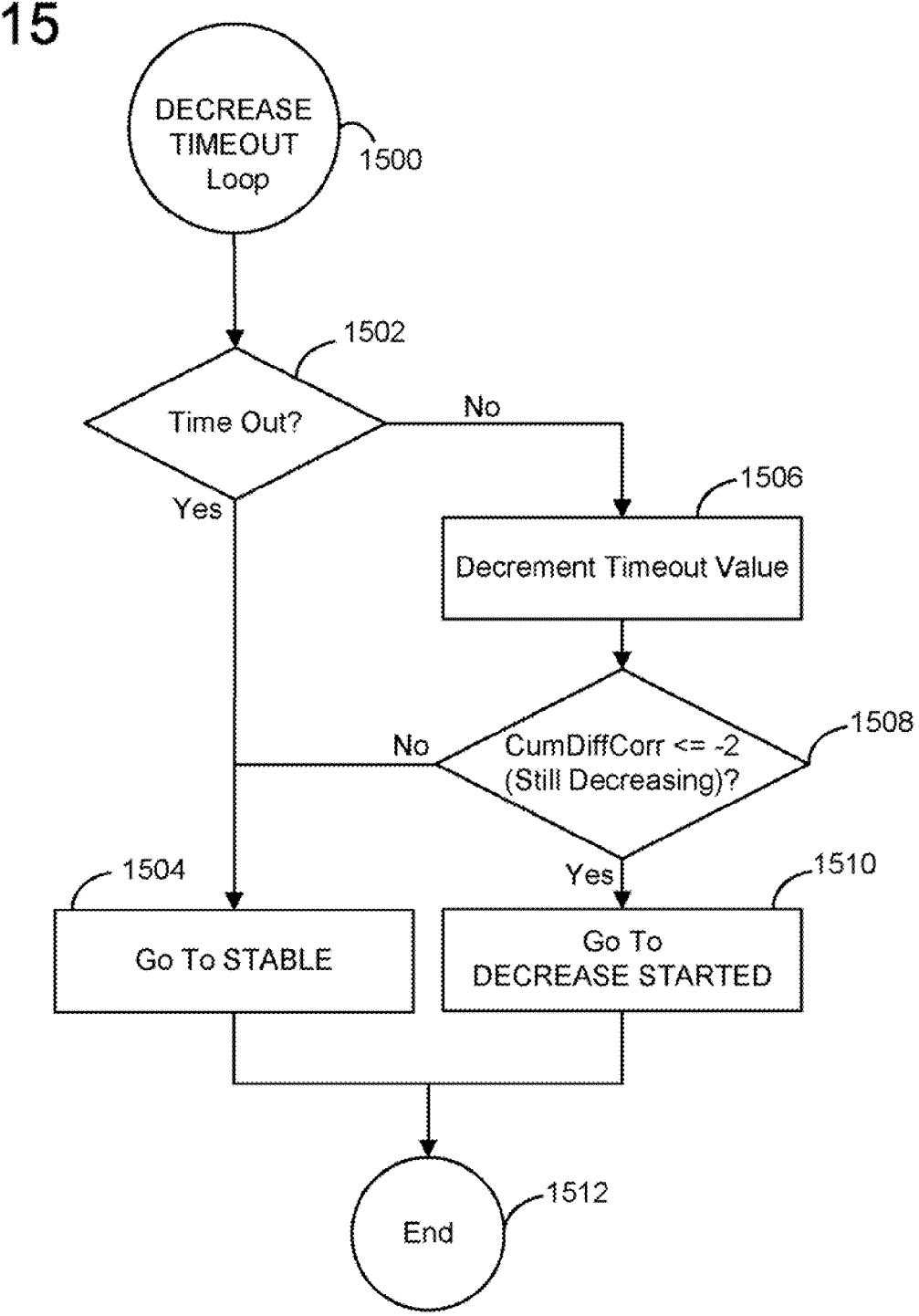
FIG. 15 is a flowchart associated with a DECREASE TIMEOUT state of the state flow diagram of FIG. 11.

FIG. 15 is a flowchart associated with DECREASE TIMEOUT state 1110 of the state flow diagram 1100 of FIG. 11. Beginning at a start of the DECREASE TIMEOUT loop 1500, the processor identifies whether a time out has occurred (step 1502 of FIG. 15). If NO in step 1502, then the timeout value is decremented (step 1506 of FIG. 15). Thereafter, the processor identifies whether the CumDiffCorr is less than or equal to −2 (or still decreasing) (step 1508 of FIG. 15). If NO in step 1508, the processor sets the process to go to STABLE (step 1504 of FIG. 15). If YES in step 1508, the processor sets the process to go to DECREASE STARTED (step 1510 of FIG. 15). If YES in step 1502, the processor sets the process to go to STABLE (step 1504 of FIG. 16). After step 1504, and after step 1510, the flowchart ends at an end block 1512.

Figure 16:
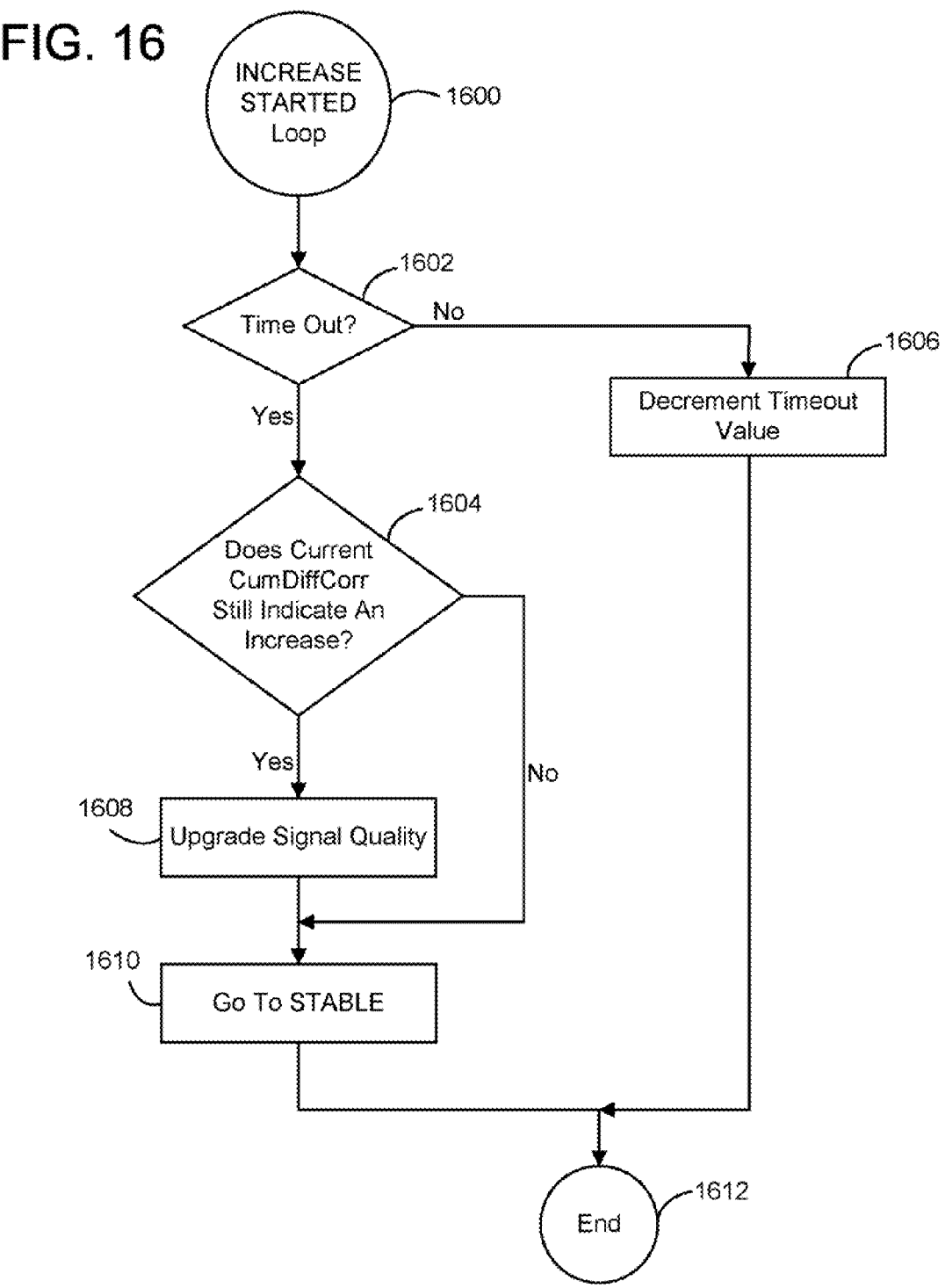
FIG. 16 is a flowchart associated with an INCREASE STARTED state of the state flow diagram of FIG. 11.

FIG. 16 is a flowchart associated with INCREASE STARTED state 1106 of the state flow diagram 1100 of FIG. 11. Beginning at a start of the INCREASE STARTED loop 1600, the processor identifies whether a time out has occurred (step 1602 of FIG. 16). If NO in step 1602, then the timeout value is decremented (step 1606 of FIG. 16). If YES in step 1602, the processor identifies whether the current CumDiffCorr value still indicates an increase (step 1604 of FIG. 16). If YES in step 1604, the processor upgrades the quality indicator (step 1608 of FIG. 16) and sets the process to go to STABLE (step 1610 of FIG. 16). If NO in step 1604, then the processor sets the process to go to STABLE (step 1610 of FIG. 16). After step 1610, and after step 1606, the flowchart ends at an end block 1612.

Processing Associated With The SNR. The SNR is retrieved periodically along with the RSSI. The SNR is the signal-to-noise ratio of the received RF signal from a wireless AP, a measurement of how clean the channel is. When the RSSI is low, then the mobile terminal may still maintain good communication with the wireless AP on both the uplink and downlink if the channel condition is otherwise clean. Conversely, there are times when the SNR is low while RSSI is high. This indicates a noisy channel. This condition is most apparent when there is RF interference but it usually lasts momentarily. At other times, when many wireless APs or mobile terminals are in operation in the coverage area, the SNR could drop or be low.

In the present techniques, the SNR is used to extend the range of WLAN coverage when quality based (solely) on the RSSI degrades to POOR. The same or similar threshold and hysteresis mechanism may be used for the SNR as with the RSSI.

Referring back to FIG. 7E, what is shown is an illustrative diagram indicating SNR thresholds which may be utilized in connection with the processing of the SNR, for use in the SNR processing module 604 of FIG. 6. Since the SNR may have wide fluctuations (which depends upon noise estimation quality), a running average is performed on the SNR. The averaged SNR value is then used to determine the current quality report. While the relevant thresholds may configurable for different WLAN drivers, the SNR averaging time base is based on five (5) consecutive samples. For a retrieval period of three (3), the averaging time is 15 seconds. This is a relatively long averaging period but, due to the long period and potential difficulty in SNR estimation, five samples provide a more stable report still representative of the environment.

Figure 17:
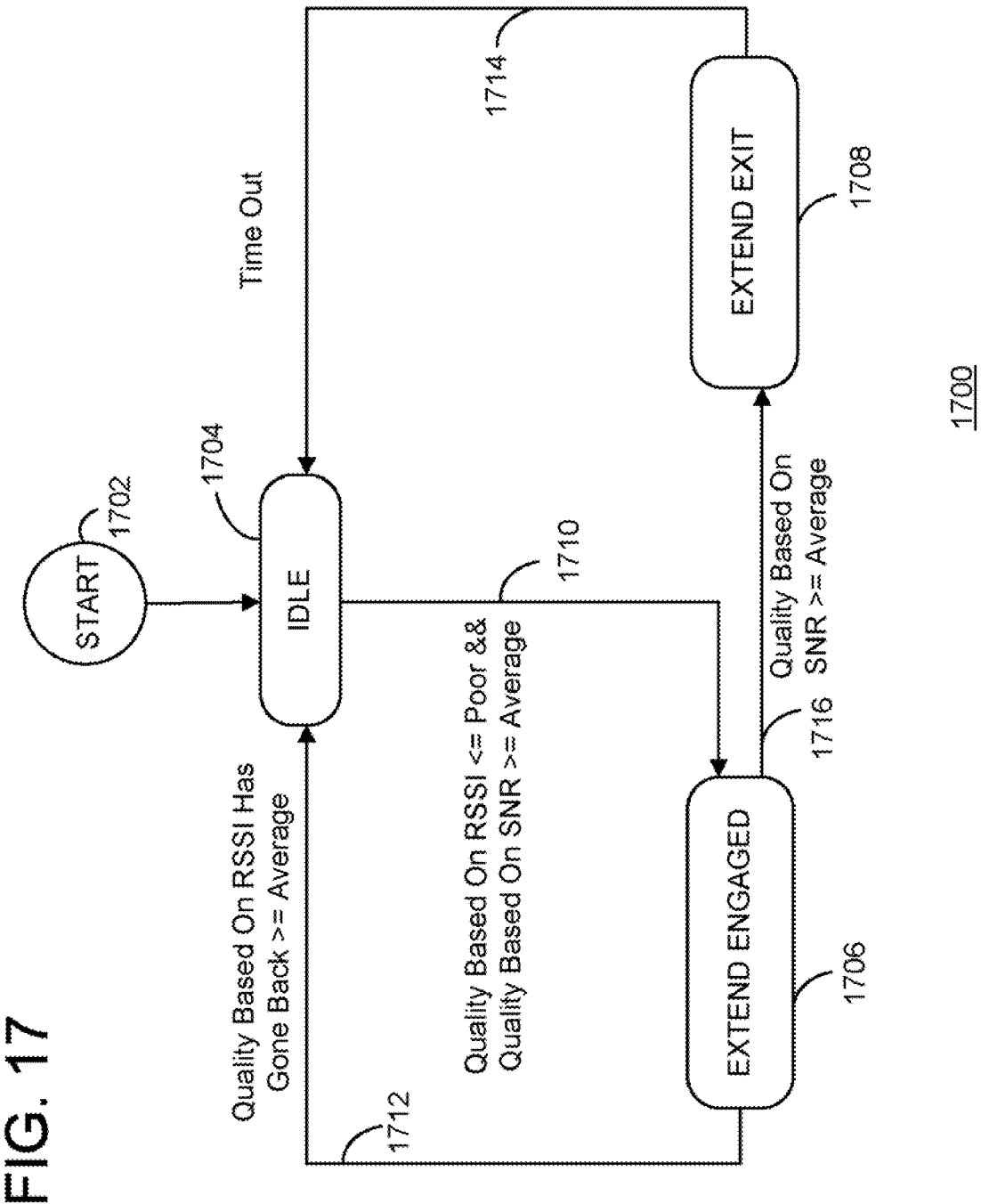
FIG. 17 is a state flow diagram of the SNR processing module of FIG. 6.

FIG. 17 is a state flow diagram 1700 of the SNR processing module 604 of FIG. 6. Beginning at a start or initialization state 1702, the module operates in accordance with an IDLE state 1704, an EXTEND ENGAGED state 1706, and an EXTEND EXIT state 1708. IDLE state 1704 is a state where the RSSI quality is still above POOR ad therefore there is no current need to extend coverage. EXTEND ENGAGED 1706 is a state where RSSI quality has dropped at or below POOR but the SNR is greater than or equal to AVERAGE; here the SNR is being utilized to extend coverage. The system reports the signal quality indication as AVERAGE. EXTEND EXIT 1708 is a state where the SNR quality has dropped below AVERAGE. This state prevents or guards against the possibility that the SNR fluctuates greatly at a fringe area, rising and dropping quality between two different quality levels (i.e. guards against the ping-pong effect). In this state, the quality indicator is set to be the quality indicator of the RSSI.

From start state 1702 of FIG. 17, operation proceeds from IDLE state 1704 which transitions to EXTEND ENGAGED state 1706 in response to identifying a condition 1710 where the quality indicator based on the RSSI is less than or equal to POOR and the quality indicator based on the RSSI is greater than or equal to AVERAGE. EXTEND ENGAGED state 1706 may transition back to IDLE state 1704 in response to identifying a condition 1712 where the quality indicator based on the RSSI has gone back to being greater than or equal to AVERAGE. Otherwise, EXTEND ENGAGED state 1706 will transition to EXTEND EXIT 1708 in response to identifying a condition 1716 where the quality indicator based on the SNR has dropped to less than or equal to POOR. EXTEND EXIT state 1708 transitions to IDLE state 1704 in response to identifying a condition 1714 where the timer has expired.

Figure 18:
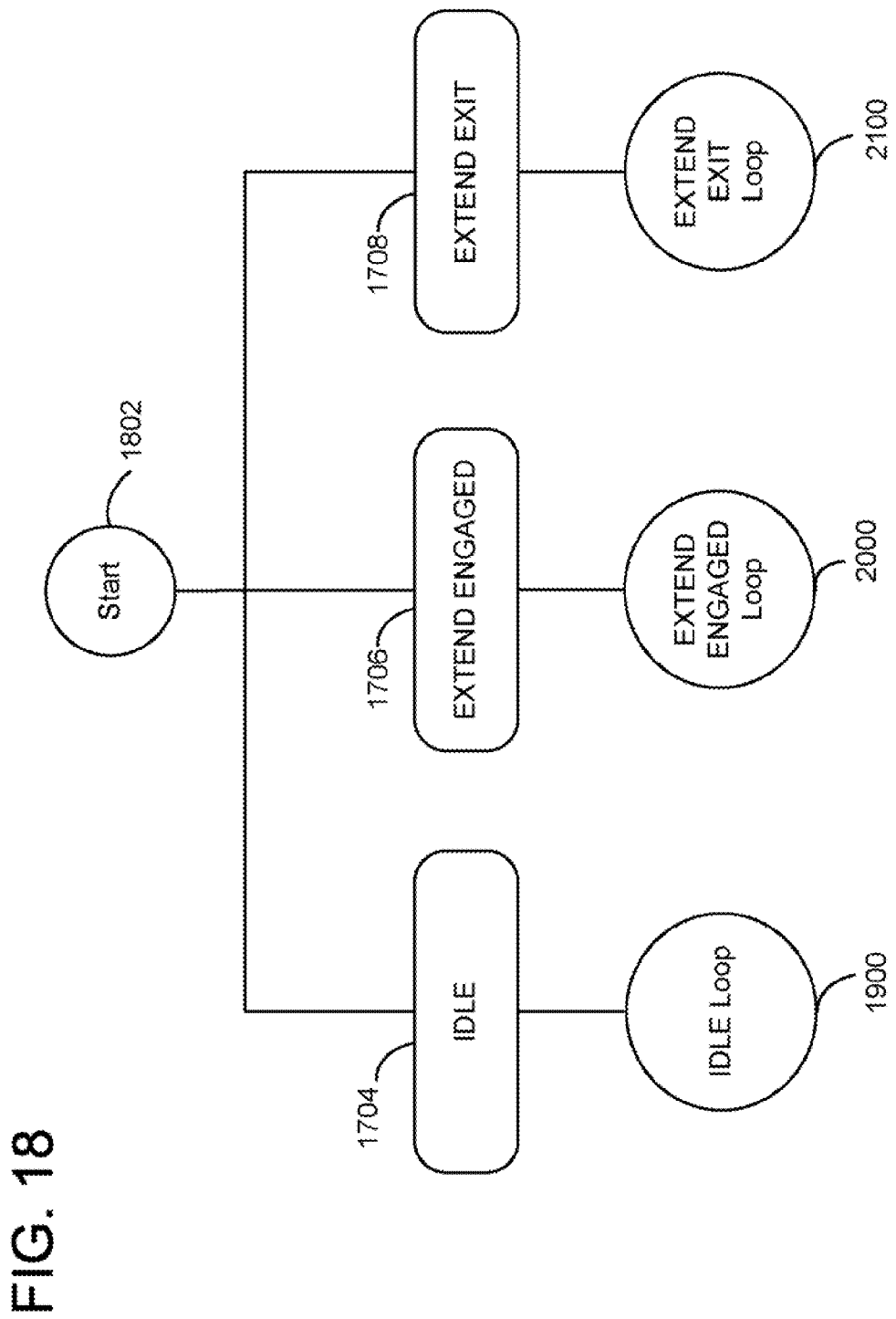
FIG. 18 is a flowchart associated with the state flow diagram of FIG. 17.

FIG. 18 is a flowchart associated with the state flow diagram 1700 of FIG. 17 pertaining to the SNR processing module 604 of FIG. 6. Beginning at a start block 1802, the IDLE state 1704 is defined by processes in an IDLE loop 1900 (see the flowchart of FIG. 19), the EXTEND ENGAGED state 1706 is defined by processes in an EXTEND ENGAGED loop 2000 (see the flowchart of FIG. 20), and the EXTEND EXIT state 1708 is defined by processes in an EXTEND EXIT loop 2100 (see the flowchart of FIG. 21).

Figure 19:
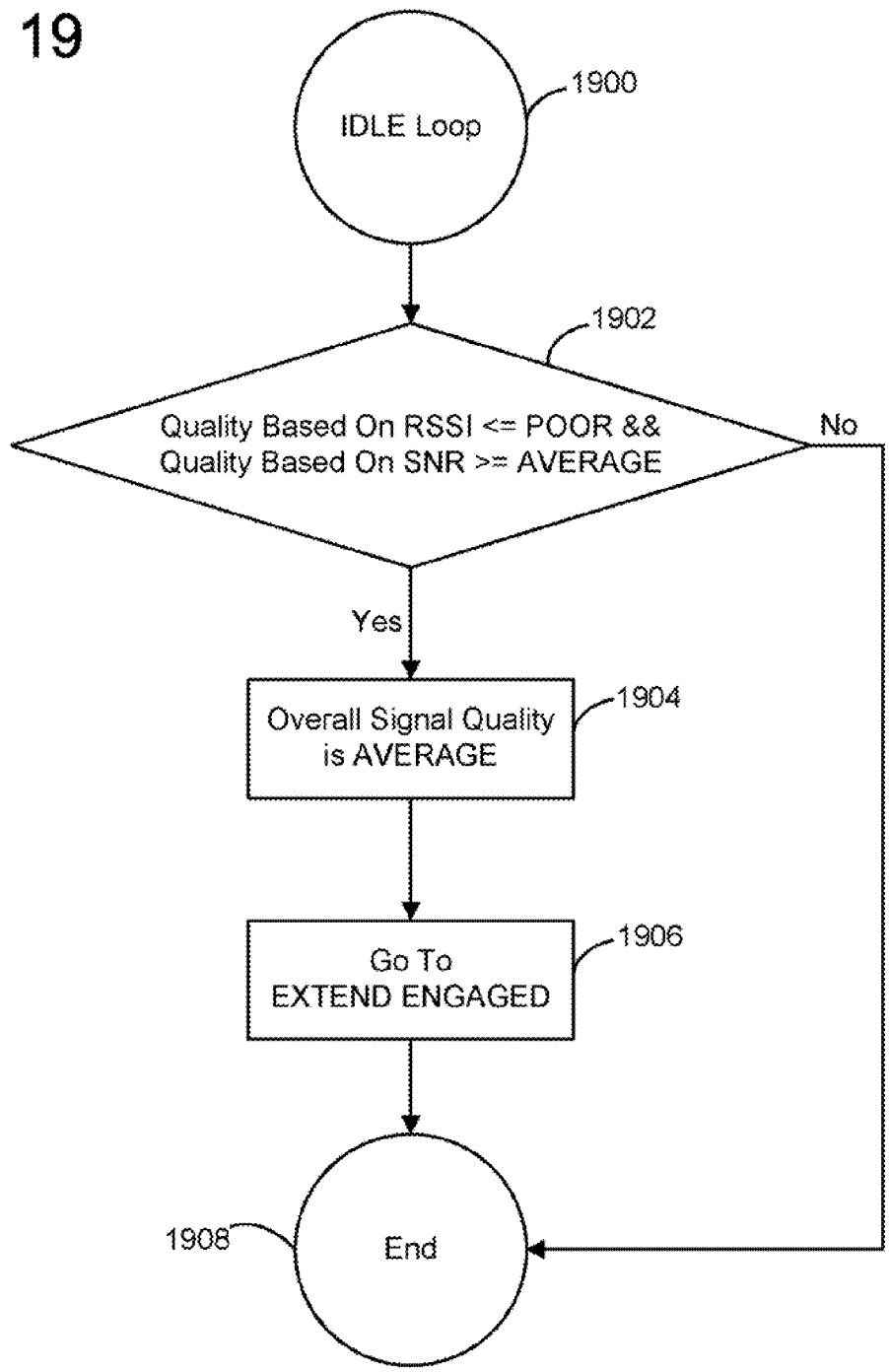
FIG. 19 is a flowchart associated with an IDLE state of the state flow diagram of FIG. 17.

FIG. 19 is a flowchart associated with IDLE state 1704 of the state flow diagram 1700 of FIG. 17. Beginning at a start of the IDLE loop 1900, the processor identifies whether the quality indicator based on the RSSI is less than or equal to POOR and the quality based on the SNR is greater than or equal to AVERAGE (step 1902 of FIG. 19). If YES at step 1902, then the signal quality indication is set to be AVERAGE (step 1904 of FIG. 19), and the processor sets the process to go to EXTEND ENGAGED (step 1906 of FIG. 19). After step 1906, or if NO at step 1902, the flowchart ends at an end block 1908.

Figure 20:
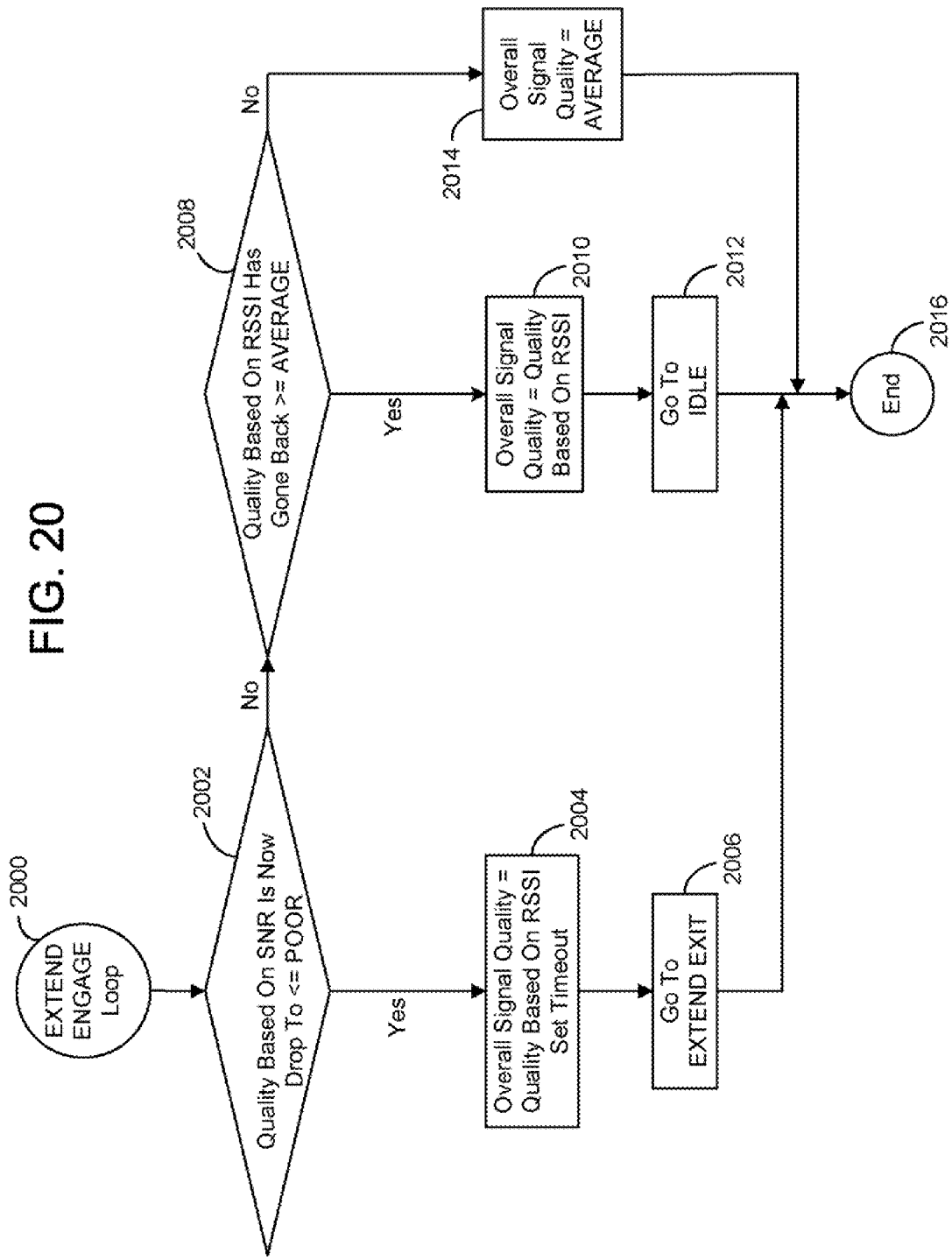
FIG. 20 is a flowchart associated with an EXTEND ENGAGED state of the state flow diagram of FIG. 17.

FIG. 20 is a flowchart associated with EXTEND ENGAGED state 1706 of the state flow diagram 1700 of FIG. 17. Beginning at a start of the EXTEND ENGAGED loop 2000, the processor identifies whether the quality indicator based on the SNR has dropped to less than or equal to POOR (step 2002 of FIG. 20). If YES at step 2002, then the signal quality indication is set to be that of the quality indicator for the SNR processing (step 2004 of FIG. 20). In addition, the timeout timer is set to its initial value and started. The processor then sets the process to go to EXTEND EXIT (step 2006 of FIG. 20). If NO at step 2002, then the processor identifies whether the quality indicator based on the RSSI has gone back to be greater than or equal to AVERAGE. If YES at step 2008, then the quality indicator is set to be that of the quality indicator for the SNR processing (step 2010 of FIG. 20), and the processor sets the process to go to IDLE (step 2012 of FIG. 20). If NO at step 2014, then the quality indicator is set to be AVERAGE (step 2014 of FIG. 20). After step 2014, step 2012, or step 2006, the flowchart ends at an end block 2016 of FIG. 20.

Figure 21:
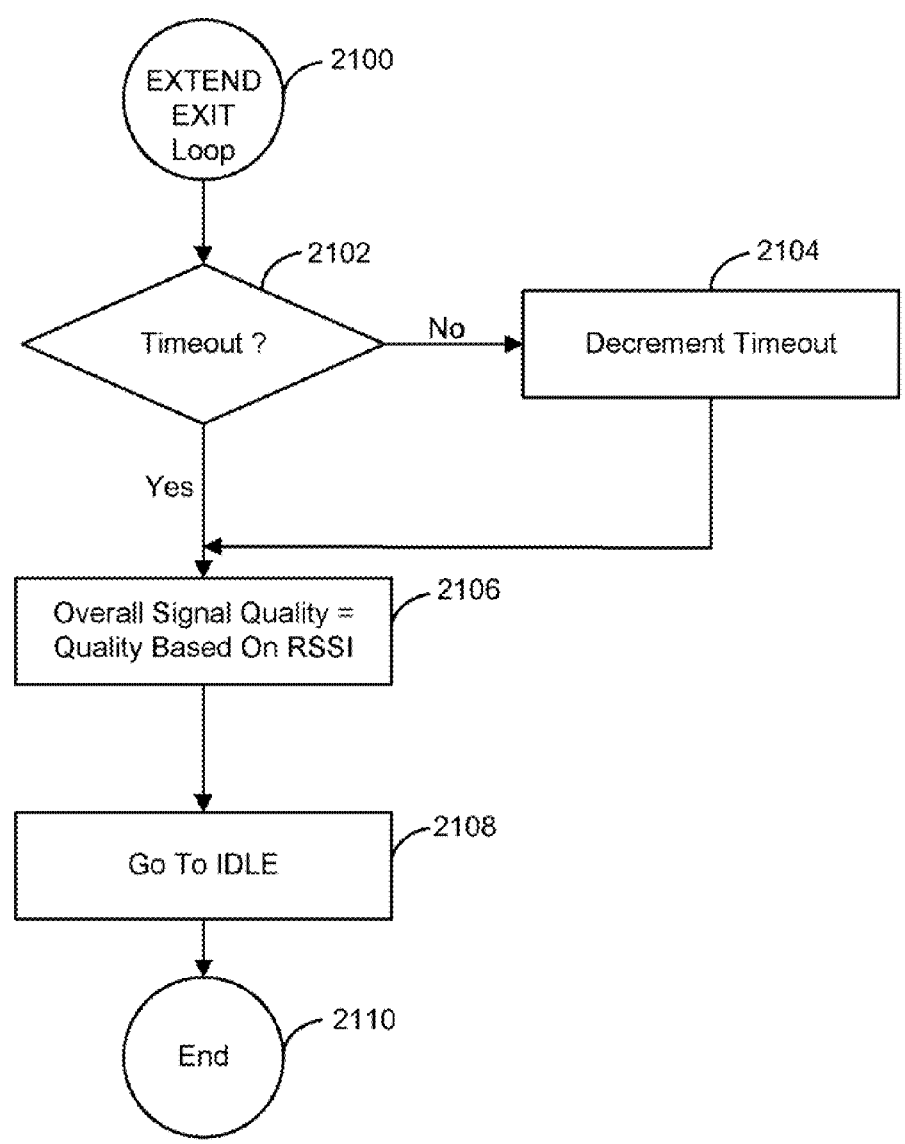
FIG. 21 is a flowchart associated with an EXTEND EXIT state of the state flow diagram of FIG. 17.

FIG. 21 is a flowchart associated with EXTEND EXIT state 1708 of the state flow diagram 1700 of FIG. 17. Beginning at a start of the EXTEND EXIT loop 2100, the processor identifies whether the timeout timer has expired (step 2102 of FIG. 21). If a timeout has not occurred in step 2102, the timeout timer is decremented (step 2104 of FIG. 21). If the timeout has occurred as identified in step 2102, or after step 2104, the quality indicator is set to be that of the quality indicator for the RSSI processing (step 2106 of FIG. 21). The processor then sets the process to go to IDLE (step 2108 of FIG. 21). The flowchart ends at an end block 2110.

Processing Associated with Uplink/Transmission Error. RSSI and SNR measurements form a signal quality that represents primarily represents what is perceived on the downlink. Although SNR also reflects uplink condition, it does not convey the over-the-air transmission contention condition. In order to sufficient guard against uplink impairments, an uplink algorithm is provided, with reference back to transmission error processing module 606 of FIG. 6. The uplink algorithm herein identifies and processes transmission retries (Tx Retries) of data packets transmitted from the mobile terminal.

Figure 22:
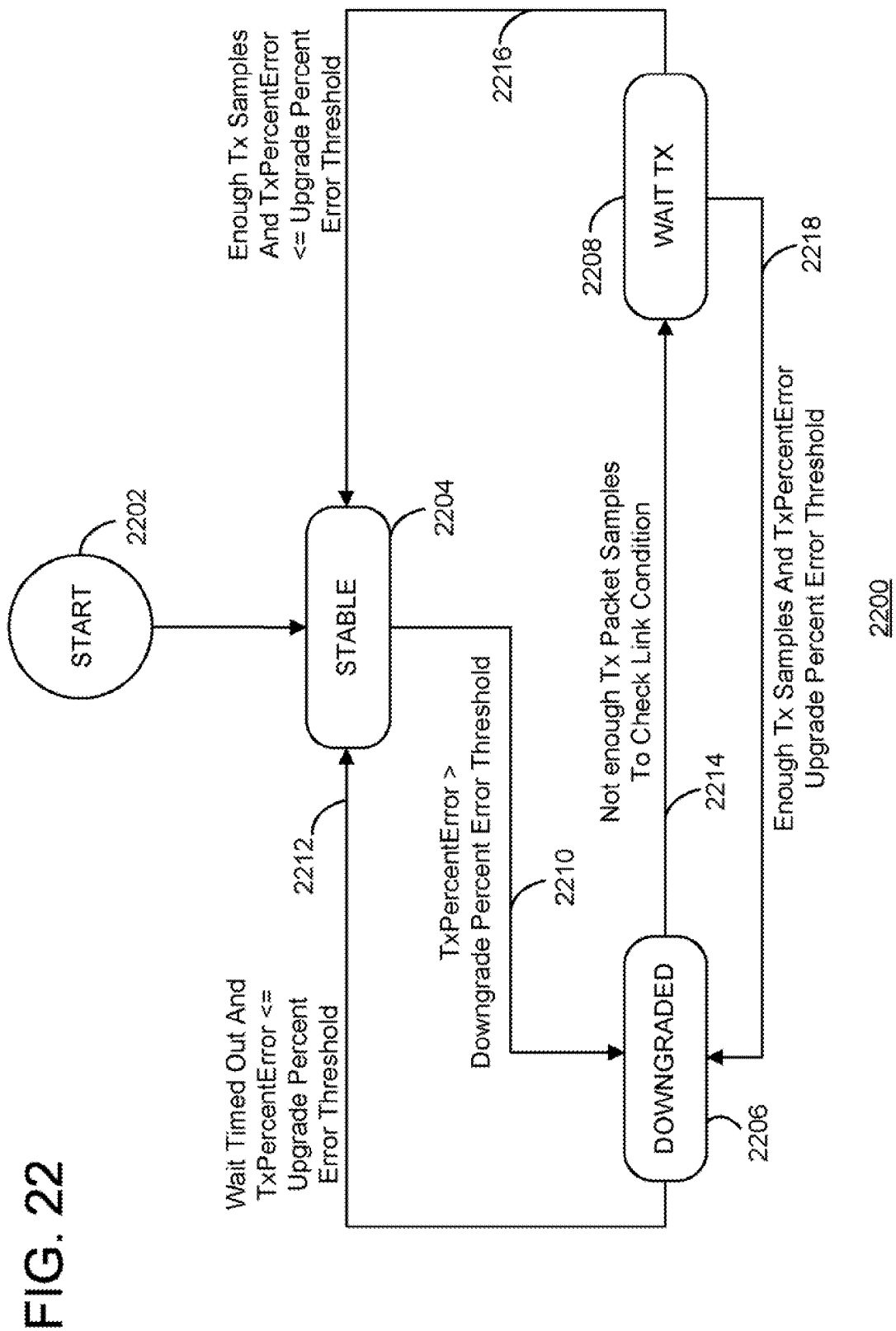
FIG. 22 is a state flow diagram of the transmission error processing module of FIG. 6.

FIG. 22 is a state flow diagram 2200 of transmission error processing module 606 of FIG. 6. From a start or initialization state 2202, the module operates in accordance with a STABLE state 2204, a DOWNGRADED state 2206, and a WAIT_TX state 2208. STABLE state 2204 is a state where the uplink quality is generally good; the algorithm reports quality obtained from the RSSI and SNR processing as described earlier above. DOWNGRADED state 2206 is a state where the uplink percent error has exceeded the downgrade threshold; the quality indicator is POOR (even regardless of RSSI, SNR results). WAIT_TX state 2208 is indicative that there is an insufficient number of transmitted data packets for analysis; NULL packets or PS-Poll Packets may be transmitted during this time (e.g. 10 packets).

From start state 2202, operation proceeds where STABLE state 2204 transitions to DOWNGRADED state 2206 in response to identifying a condition 2210 where TxPercentError>the downgrade percent error threshold. DOWNGRADED state 2206 transitions back to STABLE state 2204 in response to identifying a condition 2212 where TxPercentError<=the upgrade percent error threshold, and the wait timed out (to reduce any ping-pong effect). DOWNGRADED state 2206 transitions to WAIT_TX state 2208 in response to identifying a condition 2214 where the there is an insufficient number of transmitted data packets to check the link condition. Periodic transmission of NULL packets or PS-Polls for some time prior to entering WAIT_TX state 2208. WAIT_TX state 2208 transitions back to DOWNGRADED state 2206 in response to identifying a condition 2218 where there is a sufficient number of transmitted data packets and TxPercentError>upgrade percent error threshold. WAIT_TX state 2208 may also transition to STABLE state 2204 in response to identifying a condition 2216 where there is a sufficient number of transmitted data packets and TxPercentError<=upgrade percent error threshold.

The uplink algorithm may output whether the uplink is bad or not (e.g. GOOD or POOR). Whenever the quality indicator is indicated as being POOR, the overall quality indicator is set to POOR, regardless of the quality indicators from the RSSI and SNR processing. If there is a large transmission error, the link is likely too congested to provide good performance and, hence, it may not be practical to remain in the WLAN.

The uplink quality algorithm is divided into two parts, the first part calculates the number of retransmission errors (error calculation module 630 in FIG. 6) and the second part uses the percent error in the first stage to decide whether link is downgraded (Tx monitoring module 632 of FIG. 6). The driver is adapted to provide the following information for input to the uplink algorithm:

Tx Status: whether the data packet was ACK'ed by the wireless AP or not;
AND
Tx Rate: the transmission rate of a successfully ACK'ed data packet.

Error calculation module 630 processes this inputted information, which is dependent on whether or not the system has already detected an uplink degradation condition. The TxPercentError is then computed.

In STABLE state 2204 of FIG. 22, when uplink degradation is not (yet) detected, the uplink algorithm identifies a transmission error and increments a Tx error count upon identifying one of the following two conditions:

Tx Status = Failure; the data packet was not delivered to the wireless AP at all, i.e. no ACK was received (e.g. either due to device hardware/software failure or due to congestion in the air);
OR
Tx Status = Success; however, the transmission rate of the current data packet < transmission rate of the previous data packet. This condition indicates that, although the wireless AP has received the data packet, there was at least one transmission retry attempt before the wireless AP ACK'ed the data packet. Note that, even though retransmission is not uncommon in a WLAN environment, too much retransmission is nonetheless an indication of a poor channel.

When none of these conditions are met, the Tx error count is decremented by 1. This provides a way to integrate the Tx error over time.

The error calculation also utilizes a "degrade index." The degrade index is the number of additional errors to be added to the (normal) Tx error count. The degrade index is a way to differentiate the type of error, and helps downgrade more quickly when relatively severe types of errors are encountered. The degrade index may be defined as being SEVERE, MODERATE, or LOW, as follows:

SEVERE index: this number is added to the total Tx error count when system packet failed to be delivered to the AP (e.g. this index value may be set to 2);

MODERATE index: this number is added to the Tx error count when the data packet was received by the wireless AP but the dropped transmission is below a predetermined minimum threshold (e.g. 6 Mbps or below) (e.g. this index value may be set to 1);

LOW index: this number is added to the Tx error count when the data packet was received by the wireless AP and the transmission rate is higher than the predetermined minimum threshold (e.g. 6 Mbps).

In DOWNGRADED state 2206 or WAIT_TX state 2208, when uplink degradation condition has been detected, a Tx error is counted when:

---
Tx Status = Failure
OR
Tx rate of the data packet <= Tx rate of the data packet when degradation condition was detected.

---

As an example regarding the transmission rate degradation, the uplink quality may be detected to be POOR when the transmission rate of the data packet is less than a predetermined minimum transmission rate. For example, the predetermined minimum transmission rate may be 6 Mbps. From this point onwards, the Tx error count is incremented as long as the transmission rate<=6 Mpbs. If the transmission rate of the data packet is the same as when the uplink was downgraded, then the uplink has not recovered from the bad condition. Counting errors in this way makes it more difficult for the condition to upgrade and, therefore, the likelihood of the ping-pong effect is reduced or eliminated.

On the other hand, the Tx error count is decremented if:

---
Current Tx Rate > Tx rate when system was degraded;
AND
Current Tx Rate > Tx rate of previous data packet

---

Otherwise, the number of errors stays this same. This way, the percent error decreases slower than it would otherwise if the error count were decremented whenever the error condition is not met; this measure is put in place to guard against the ping-pong effect.

Thus, the mobile terminal determines a Tx error count (or more generally, a transmission error value) for data packet transmissions based on a count of data packet errors identified over a predetermined time period. A data packet error may be identified by identifying a complete failure to transmit the data packet, or a reduced data transmission rate for the transmission. An increased count (i.e. >1) or multiplier may be included for each data packet error that is associated with a complete failure or a low data transmission rate. The increased count or multiplier may vary depending on severity.

A transmission error percentage value is calculated based on the transmission error value and the total number of attempted data packet transmissions over the predetermined time period. If the transmission error percentage value is greater than a predetermined error percentage value, the mobile terminal provides the indication to switch the communication operations from the WLAN to the WWAN.

As described earlier, the mobile terminal may interface and/or be constructed with a WLAN driver or chipset, where each driver has a rate adaptation algorithm that drops and raises the data transmission rate based on transmission retries and errors. Although the rate adaptation algorithm of each type of driver may be different from one type to another, the techniques of the present disclosure may be generic to all driver types. Here, the parameters utilized in the technique (e.g. the index values, severity, etc., utilized for a given transmission rate or change thereof) may be stored in a programmable memory location in memory of the mobile terminal so as to be tunable or programmable in accordance with the driver type. Thus, the algorithm logic in the mobile terminal (e.g. computer instructions) may remain fixed regardless of (or independent from) the driver type utilized.

In one example, it is identified whether an attempted transmission of a data packet results in a data packet error, whether the data packet error corresponds to a complete failure or a transmission retry, and the data transmission rate of the transmission retry (if the data packet error does indeed correspond to a transmission retry). If the data packet error corresponds to a transmission retry, and the data transmission rate is identified to be greater than a predetermined data transmission rate, the transmission error value is updated by increasing (e.g. incrementing) the transmission error value by a value of n. On the other hand, if the data packet error corresponds to a transmission retry and the data transmission rate is identified to be less than the predetermined data transmission rate (or a complete failure), the transmission error value is updated by increasing (e.g. incrementing) the transmission error value by a value of m>n. Otherwise, if there is no data packet error, the process may refrain from increasing (or incrementing) the transmission error value. For example, the transmission error value may not be increased or incremented by n or m, but rather may be unchanged, decremented, or increased by a value of k<m<n.

Uplink Monitoring Loop. When the uplink is active, the uplink quality within an error monitoring time window is regularly assessed. An uplink quality determination is not straightforward, however, as data packet transmission is often sparse and not regular. This makes a determination of the size of the error monitor time window to be difficult. Consider, for example, a monitor window size set to be 1 second in length. If a data packet is transmitted every 500 ms (within one window), at most two data packets will be transmitted. If one of these data packets results in an increment of the Tx error count, that would amount to a 50% percent Tx error. As apparent, however, the 50% figure is inaccurate as too few samples were taken. To avoid this situation, the technique of the present disclosure sets a minimum number of data packets to be transmitted within certain time interval before the TxPercentError is utilized to determine uplink condition.

Uplink Processing—Downgrade Determination. When in STABLE state 2204, the uplink algorithm is monitoring for a downgrade decision. The link is downgraded in response to identifying the following condition:

```
TxPercentError > DowngradeTxPercentThreshold
AND
numTxPackets within an interval >=
   minRequiredTxPacketsForDowngrade
```

Once the link is downgraded, a timer is started (i.e. initialized and run) to ensure that no upgrade will be made within a timeout period defined by the initial value of the timer. Again, this procedure is utilized to prevent the ping-pong effect.

To better illustrate, during a call through the WLAN, transmitted data packets are periodic and often, there are a large number of samples to get a good representation of the uplink quality. Subsequently, for some reason, the air link has degraded and the uplink quality is downgraded to POOR. As a result, the call gets handed over, and therefore the transmission rate drops significantly and data packet transmission becomes sparse. As a result of the sparse transmission, the percent error drops significantly which causes the uplink to be GOOD again, thereby resulting in the ping-pong effect. Thus, having a timeout before checking for the uplink condition may minimize or prevent this effect from occurring.

Figure 23:
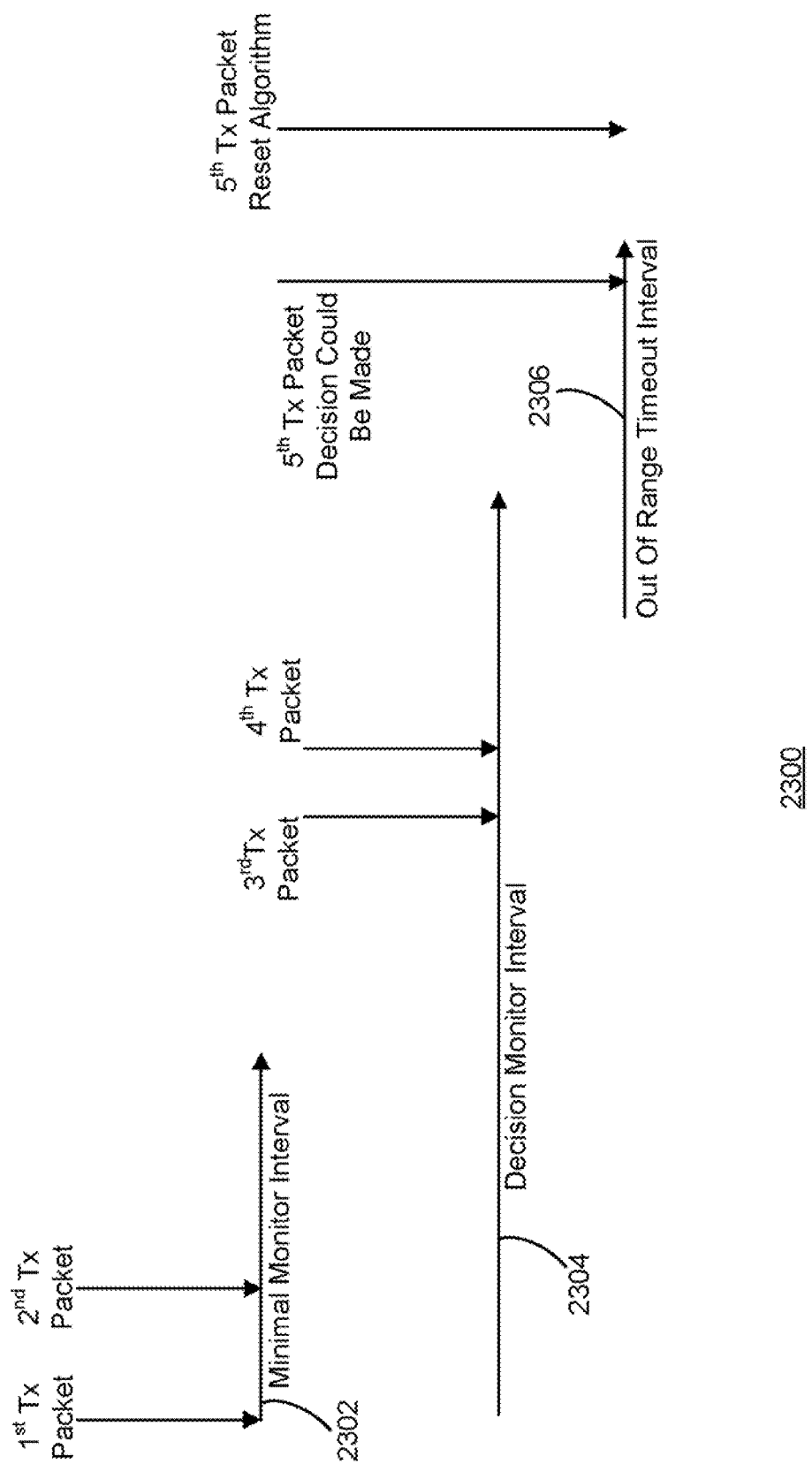
FIG. 23 is a timing diagram to illustrate an example of processing in the transmission error processing module of FIG. 6.

Referring now to FIG. 23, a timing diagram 2300 is utilized to illustrate an example of processing in transmission error processing module 606 of FIG. 6. The uplink algorithm is adapted to utilize different monitoring intervals as shown in FIG. 23, which include a minimum monitor interval 2302, a decision monitor interval 2304, and an out-of-range timeout interval 2306. In one embodiment, the following values are utilized:

```
DowngradeTxPercentThreshold = 40% for 4 consecutive reports;
minRequiredTxPacketsForDowngrade = 5;
minimum monitor interval = 500 milliseconds;
decision monitor interval = 2 seconds;
out of range timeout interval = 1 second; and
timeout to prevent upgrade after link is downgraded = 60 seconds.
```

Consider minRequiredTxPacketsForDowngrade to be five (5) data packets. Minimum monitor interval 2302 is the minimum amount of time that has to elapse before the percent error may be utilized for a degradation/downgrade determination. The $1^{st}$ and $2^{nd}$ data packets arriving within this time frame contribute to the percent error, but no decision making is performed (i.e. it is inhibited). Decision monitor interval 2304 provides the monitoring window. If, within this monitoring window, numTxPackets>=minRequiredTxPacketsForDowngrade, then the percent error is used (e.g. immediately) to check if a downgrade is required. In the case of FIG. 23, there are an insufficient number of data packets to check the results (i.e. the number is 2<5); therefore, no decision is made. Out-of-range timeout interval 2306 is the maximum time that may elapse between the last transmitted data packet and the current one before data packets are deemed to bear no correlating information on link quality, and therefore the uplink algorithm is reset. If the $5^{th}$ data packet is transmitted within this interval, then the uplink algorithm proceeds to make and provide a decision. If, however, the $5^{th}$ data packet arrived later than this period, then too much time has elapsed between data packets and the results obtained from $1^{st}$ to $4^{th}$ data packets may not be related to result in the $5^{th}$ data packet, and therefore the uplink algorithm is reset. A new monitor interval is started each time the decision-making process is invoked.

Uplink Processing—Upgrade Determination. When in DOWNGRADED state 2206 or WAIT_TX state 2208 of FIG. 22, the uplink algorithm is monitoring for an upgrade decision. In this example, an upgrade is not performed until 60 seconds after the downgrade was detected. A link is upgraded in response to identifying the following condition:

```
TxPercentError <= UpgradeTxPercentThreshold
AND
numTxPackets within an interval >= minRequiredTxPacketsForUpgrade
```

In one embodiment, the following constants are utilized:

```
UpgradeTxPercentThreshold = 20%
minRequiredTxPacketsForUpgrade = 10
time between current Tx and last transmitted Tx = 10 seconds
```

If the time between the current data packet and the last transmitted data packet has been too long, the uplink algorithm issues a PS-Poll or Null frames to test the link before making a decision to upgrade based on the above-identified condition. If, however, the interval falls within range, a decision is made and provided (e.g. immediately).

Thus, as described herein, a mobile communication device or terminal is adapted to operate in a WLAN and a WWAN. The mobile terminal performs communication operations using its WLAN transceiver portion for maintaining a voice or data call via a wireless AP of the WLAN. During this time, the mobile terminal is adapted to perform a downlink signal quality determination and an uplink signal quality determination. For the downlink signal quality determination, the mobile terminal identifies an RSSI value and an SNR value of an RF signal of the wireless AP. When the RSSI value is less than a predetermined RSSI value, and the SNR value is less than a predetermined SNR value, the mobile terminal provides an indication to switch the communication operations from the WLAN to the WWAN. However, when the RSSI value is less than the predetermined RSSI value, but the SNR value is greater than the predetermined SNR value, the mobile terminal provides an indication to maintain the communication operations in the WLAN using the WLAN transceiver portion. Such technique effectively extends the coverage area of the WLAN for the mobile terminal.

In a concurrent process for uplink signal quality determination, the mobile terminal determines a transmission error value for data packet transmissions based on a count of data packet errors identified over a predetermined time period. A data packet error may be identified by identifying a complete failure to transmit the data packet or a reduced data transmission rate for the transmission. An increased count (i.e. >1) or multiplier may be included for each data packet error that is associated with a complete failure or a low data transmission rate. The Increased count or multiplier may vary depending on severity. A transmission error percentage value is calculated based on the transmission error value and the total number of attempted data packet transmissions over the predetermined time period. When the transmission error percentage value is greater than a predetermined error percentage value, the mobile terminal provides the indication to switch the communication operations from the WLAN to the WWAN; otherwise the mobile terminal refrains from providing such indication.

In one embodiment, the mobile terminal identifies whether an attempted transmission of a data packet results in a data packet error, whether the data packet error corresponds to a complete failure or a transmission retry, and the data transmission rate of the transmission retry (if the data packet error is indeed associated with a transmission retry). If mobile terminal identifies the data packet error to correspond to a transmission retry, where the data transmission rate is identified to be greater than a predetermined data transmission rate, the mobile terminal updates the transmission error value by increasing (e.g. incrementing) the transmission error value by a value of n. On the other hand, if the mobile terminal identifies the data packet error to correspond to a transmission retry where the data transmission rate is identified to be less than the predetermined data transmission rate (or a complete failure), the mobile terminal updates the transmission error value by increasing (e.g. incrementing) the transmission error value by a value of m>n. Otherwise, if there is no data packet error, the mobile terminal may refrain from increasing (or incrementing) the transmission error value.

The techniques of the present disclosure may be embodied in a signal processing apparatus for use in a mobile terminal for switching communication operations for a voice or data call from a WLAN to a WWAN. The signal processing apparatus may include an RSSI processing module, a SNR processing module, a range extension module, and a signal quality determination module. The RSSI processing module is adapted to identify an RSSI value of an RF signal of a wireless AP of the WLAN and to provide, at its output, one of a plurality of discrete quality indicators based on the RSSI value. The SNR processing module is adapted to identify a SNR value of the RF signal of the wireless AP and to provide, at its output, one of the plurality of discrete quality indicators based on the SNR value. The range extension module is adapted to provide, at its output, the discrete quality indicator from the RSSI processing module when the RSSI value is greater than a predetermined RSSI value, but provide the discrete quality indicator from the SNR processing module when the RSSI value is less than the predetermined RSSI value. The signal quality determination module is adapted to provide, at its output, an indication to maintain the communication operations in the WLAN when the discrete quality indicator from the range extension module is a first discrete quality indicator, but provide an indication to switch the communication operations from the WLAN to the WWAN when the discrete quality indication from the range extension module is a second discrete quality indicator.

The signal processing apparatus may also include a transmission error processing module. The transmission error processing module is adapted to determine a transmission error value for transmissions from the mobile terminal and to provide, at its output, one of the plurality of discrete quality indicators based on the transmission error value. The signal quality determination module is then further adapted to provide the indication to switch the communication operations from the WLAN to the WWAN when the discrete quality indication from the transmission error processing module is the second discrete quality indicator. The transmission error processing module may be further adapted to determine a transmission error value for transmissions from the mobile terminal based on a count of data packet errors of the transmissions identified over a predetermined time period, and to calculate a transmission error percentage value based on the transmission error value and a total number of attempted data packet transmissions over the predetermined time period. The transmission error processing module may be even further adapted to identify a data packet error by identifying a reduction in a data transmission rate of the transmissions.

The above-described embodiments of the present disclosure are intended to be examples only. Although the embodiment described related to a WLAN of the IEEE 802.11 type and a WWAN of the cellular network type, any suitable wireless network technologies may be utilized, such as WiMAX technologies (e.g. IEEE 802.16e-based technologies). For example, the WLAN may be an IEEE 802.11-based network and the WWAN may be an IEEE 802.16e-based network. As another example, the WLAN may be an IEEE 802.16e-based network and the WWAN may be the cellular network. Also, the WWAN described herein to be a cellular telecommunications network of the GSM/GPRS type may further or alternatively operative in accordance with EDGE or EGPRS standards, or other suitable cellular standard such as LTE, EV-DO, UMTS, HSPA, as examples. Note also that any specific values utilized in the processes herein (e.g. for comparison purposes, to provide thresholds or limits, etc.) are merely examples, and that any suitable predetermined values may be utilized. Those of skill in the art may effect alterations, modifications and variations to the embodiments without departing from the scope of the application.

What is claimed is:

1. A method in a mobile terminal which is adapted to maintain a voice or data call via a wireless access point (AP) of a wireless local area network (WLAN), the method comprising the acts of:
   identifying a received signal strength indicator (RSSI) value of a radio frequency (RF) signal of the wireless AP;
   identifying a signal-to-noise ratio (SNR) value of the RF signal of the wireless AP;
   when the RSSI value is less than a predetermined RSSI value, but the SNR value is greater than a predetermined SNR value, providing an indication to maintain the communication operations in the WLAN; and
   when the RSSI value is less than the predetermined RSSI value, and the SNR value is less than the predetermined SNR value, providing an indication to switch the communication operations from the WLAN to a wireless wide area network (WWAN).

2. The method of claim 1, comprising the further act of:
   when the RSSI value is greater than the predetermined RSSI value, or the SNR value is greater than the predetermined SNR value, providing the indication to maintain the communication operations in the WLAN.

3. The method of claim 1, comprising the further acts of:
   determining a transmission error value for transmissions from the mobile terminal based on a count of data packet errors of the transmissions identified over a predetermined time period;
   calculating a transmission error percentage value based on the transmission error value and a total number of attempted data packet transmissions over the predetermined time period; and
   when the transmission error percentage error value is greater than a predetermined error percentage value, providing the indication to switch the communication operations from the WLAN to the WWAN.

4. The method of claim 3, further comprising the act of:
   identifying a data packet error by identifying a reduction in a data transmission rate of the transmissions.

5. The method of claim 3, wherein the act of determining the transmission error value comprises the further act of:
   for each attempted transmission of a data packet:

identifying whether the attempted transmission of the data packet results in a data packet error;

identifying whether a data transmission rate for retransmission of the data packet is less than a predetermined data transmission rate; and increasing the transmission error value by a value of n when the data transmission rate is greater than the predetermined data transmission rate, but otherwise increasing the transmission error value by a value of m>n when the data transmission rate is less than the predetermined data transmission rate.

6. The method of claim 1, further comprising:

in a concurrent process for uplink signal quality determination, determining a transmission error value for transmissions from the mobile terminal based on a count of data packet errors of the transmissions identified over a predetermined time period, wherein a data packet error is identified by identifying a reduction in a data transmission rate of the transmissions, calculating a transmission error percentage value based on the transmission error value and a total number of attempted data packet transmissions over the predetermined time period, and when the transmission error percentage error value is greater than a predetermined error percentage value, providing the indication to switch the communication operations for the voice or data call from the WLAN to the WWAN.

7. The method of claim 6, further comprising:

identifying whether a time period between two consecutively-transmitted data packets of the transmissions is greater than the predetermined time period; and when the time period is greater than the predetermined time period, resetting the count of the number of data packets transmitted from the mobile terminal.

8. A mobile terminal adapted to operate in a wireless local area network (WLAN) and a wireless wide area network (WWAN), the mobile terminal comprising:

a WLAN transceiver portion which is adapted for communicating via a WLAN;

a WWAN transceiver portion which is adapted for communicating via a WWAN;

one or more processors coupled to the WLAN and WWAN transceiver portions;

the one or more processors being adapted to:

perform communication operations using the WLAN transceiver portion for maintaining a voice or data call via a wireless access point (AP) of the WLAN;

identify a received signal strength indicator (RSSI) value of a radio frequency (RF) signal of the wireless AP;

identify a signal-to-noise ratio (SNR) value of the RF signal;

when the RSSI value is less than a predetermined RSSI value, but the SNR value is greater than a predetermined SNR value, provide an indication to maintain the communication operations in the WLAN using the WLAN transceiver portion; and when the RSSI value is less than the predetermined RSSI value, and the SNR value is less than the predetermined SNR value, provide an indication to switch the communication operations from the WLAN to the WWAN.

9. The mobile terminal of claim 8, wherein the one or more processors are further adapted to:

when the RSSI value is greater than the predetermined RSSI value, or the SNR value is greater than the predetermined SNR value, maintain the communication operations in the WLAN using the WLAN transceiver portion.

10. The mobile terminal of claim 9, wherein the one or more processors are further adapted to:

determine a transmission error value for transmissions from the mobile terminal based on a count of data packet errors of the transmissions identified over a predetermined time period;

calculate a transmission error percentage value based on the transmission error value and a total number of attempted data packet transmissions over the predetermined time period; and when the transmission error percentage error value is greater than a predetermined error percentage value, provide the indication to switch the communication operations from the WLAN to the WWAN.

11. The mobile terminal of claim 10, wherein the one or more processors are further adapted to:

identify a data packet error by identifying a reduction in a data transmission rate of the transmissions.

12. The mobile terminal of claim 10, wherein the one or more processors are further adapted to determine the transmission error value by:

for each attempted transmission of a data packet:

identifying whether the attempted transmission of the data packet results in a data packet error;

identifying whether a data transmission rate for retransmission of the data packet is less than a predetermined data transmission rate; and increasing the transmission error value by a value of n when the data transmission rate is greater than the predetermined data transmission rate, but otherwise increasing the transmission error value by a value of m>n when the data transmission rate is less than the predetermined data transmission rate.

13. The mobile terminal of claim 10, wherein the one or more processors are further adapted to:

maintain a count of a number of data packets transmitted from the mobile terminal; and refrain from using the transmission error value for providing the indication to switch the communication operations until the number of data packets is greater than a predetermined number of data packets.

14. The mobile terminal of claim 13, wherein the one or more processors are further adapted to:

identify whether a time period between two consecutively-transmitted data packets of the transmissions is greater than the predetermined time period; and when the time period is greater than the predetermined time period, reset the count of the number of data packets transmitted from the mobile terminal.

15. A signal processing apparatus for use in a mobile terminal for switching communication operations for a voice or data call from a wireless local area network (WLAN) to a wireless wide area network (WWAN), comprising:

a received signal strength indicator (RSSI) processing module, the RSSI processing module being adapted to identify an RSSI value of a radio frequency (RF) signal of a wireless access point (AP) of the WLAN and to provide, at its output, one of a plurality of discrete quality indicators based on the RSSI value;

a signal-to-noise ratio (SNR) processing module, the SNR processing module being adapted to identify a SNR value of the RF signal of the wireless AP and to provide, at its output, one of the plurality of discrete quality indicators based on the SNR value;

a range extension module having a first input coupled to the output of the RSSI processing module, a second input coupled to the output of the SNR processing module, and an output;

the range extension module being adapted to provide, at its output, the discrete quality indicator from the RSSI processing module when the RSSI value is greater than a predetermined RSSI value;

the range extension module being adapted to provide, at its output, the discrete quality indicator from the SNR processing module when the RSSI value is less than the predetermined RSSI value;

a signal quality determination module having an input coupled to an output of the range extension module;

the signal quality determination module being adapted to provide an indication to maintain the communication operations in the WLAN when the discrete quality indicator from the range extension module is a first discrete quality indicator; and the signal quality determination module being further adapted to provide an indication to switch the communication operations from the WLAN to the WWAN when the discrete quality indication from the range extension module is a second discrete quality indicator.

16. The signal processing apparatus of claim 15, further comprising:
a transmission error processing module having an output coupled to an input of the signal quality determination module;
the transmission error processing module being adapted to determine a transmission error value for transmissions from the mobile terminal and to provide, at its output, one of the plurality of discrete quality indicators based on the transmission error value; and
the signal quality determination module being further adapted to provide the indication to switch the communication operations from the WLAN to the WWAN when the discrete quality indication from the transmission error processing module is the second discrete quality indicator.

17. The signal processing apparatus of claim 15, further comprising:
the transmission error processing module being further adapted to determine a transmission error value for transmissions from the mobile terminal based on a count of data packet errors of the transmissions identified over a predetermined time period, and to calculate a transmission error percentage value based on the transmission error value and a total number of attempted data packet transmissions over the predetermined time period.

18. The signal processing apparatus of claim 17, further comprising:
the transmission error processing module being further adapted to identify a data packet error by identifying a reduction in a data transmission rate of the transmissions.

19. The signal processing apparatus of claim 17, further comprising:
the transmission error processing module being further adapted to, for each attempted transmission of a data packet:
identify whether the attempted transmission of the data packet results in a data packet error;
identify whether a data transmission rate for retransmission of the data packet is less than a predetermined data transmission rate; and
increase the transmission error value by a value of n when the data transmission rate is greater than the predetermined data transmission rate, but otherwise increase the transmission, error value by a value of m>n when the data transmission rate is less than the predetermined data transmission rate.

20. The signal processing apparatus of claim 15, wherein the mobile terminal operates in accordance with IEEE 802.11 for the WLAN and in accordance with a cellular telecommunications standard for the WWAN.

* * * * *